United States Patent
Brewer et al.

(10) Patent No.: US 12,458,925 B2
(45) Date of Patent: Nov. 4, 2025

(54) MEMBRANE DEVICES FOR FILTRATION AND EXTRACTION

(71) Applicant: DPX Technologies, LLC, Columbia, SC (US)

(72) Inventors: William E. Brewer, Columbia, SC (US); Matthew G. Fitts, Columbia, SC (US)

(73) Assignee: DPX Technologies, Inc., Columbia, SC (US)

( * ) Notice: Subject to any disclaimer, the term of this patent is extended or adjusted under 35 U.S.C. 154(b) by 1089 days.

(21) Appl. No.: 17/472,659

(22) Filed: Sep. 12, 2021

(65) Prior Publication Data

US 2022/0088537 A1    Mar. 24, 2022

Related U.S. Application Data

(60) Provisional application No. 63/080,396, filed on Sep. 18, 2020.

(51) Int. Cl.
*B01D 61/18* (2006.01)
*B01D 69/10* (2006.01)
*G01N 1/40* (2006.01)

(52) U.S. Cl.
CPC .......... *B01D 61/18* (2013.01); *B01D 69/108* (2022.08); *G01N 1/4077* (2013.01); *G01N 2001/4088* (2013.01)

(58) Field of Classification Search
CPC ...... B01D 61/18; B01D 69/10; B01D 69/108; B01L 3/0275; B01L 2200/026; B01L 2200/0631; B01L 2200/0689; B01L 2300/0681; G01N 1/4077; G01N 2001/4088
See application file for complete search history.

(56) References Cited

U.S. PATENT DOCUMENTS

| | | | | |
|---|---|---|---|---|
| 4,341,635 | A * | 7/1982 | Golias | B01D 15/3804 |
| | | | | 210/656 |
| 8,202,693 | B2 | 6/2012 | Guo | |
| 2006/0182657 | A1 | 8/2006 | Pathirana et al. | |
| 2016/0103045 | A1 * | 4/2016 | Scott | B01L 3/5021 |

FOREIGN PATENT DOCUMENTS

| | | |
|---|---|---|
| EP | 1835020 A1 | 9/2007 |
| WO | 2018026886 A1 | 2/2018 |

OTHER PUBLICATIONS

Extended European Search Report issued in European Patent Application No. 21196765.8, dated Dec. 21, 2021 (9 pages).

* cited by examiner

*Primary Examiner* — Patrick Orme
(74) *Attorney, Agent, or Firm* — Boulware & Valoir PLLC

(57) ABSTRACT

A device for filtration or extraction using at least one filtration membrane is disclosed. The device is shaped like a Buchner funnel, but small enough to fit with wide bore pipette tips, slip tip syringes or an adaptor of a robotic liquid handler or pipettor. It also houses one or more filtration membranes and or a separation resin. A reservoir adaptor can be added to the top in a fluid tight manner to provide a removable large volume container where needed for larger samples, and a gasket adaptor allows the reservoir to be connected to other devices in a fluid tight manner.

23 Claims, 22 Drawing Sheets

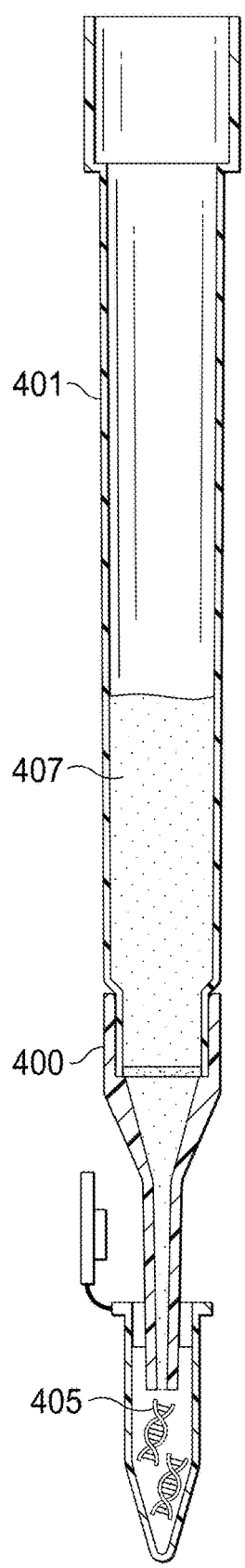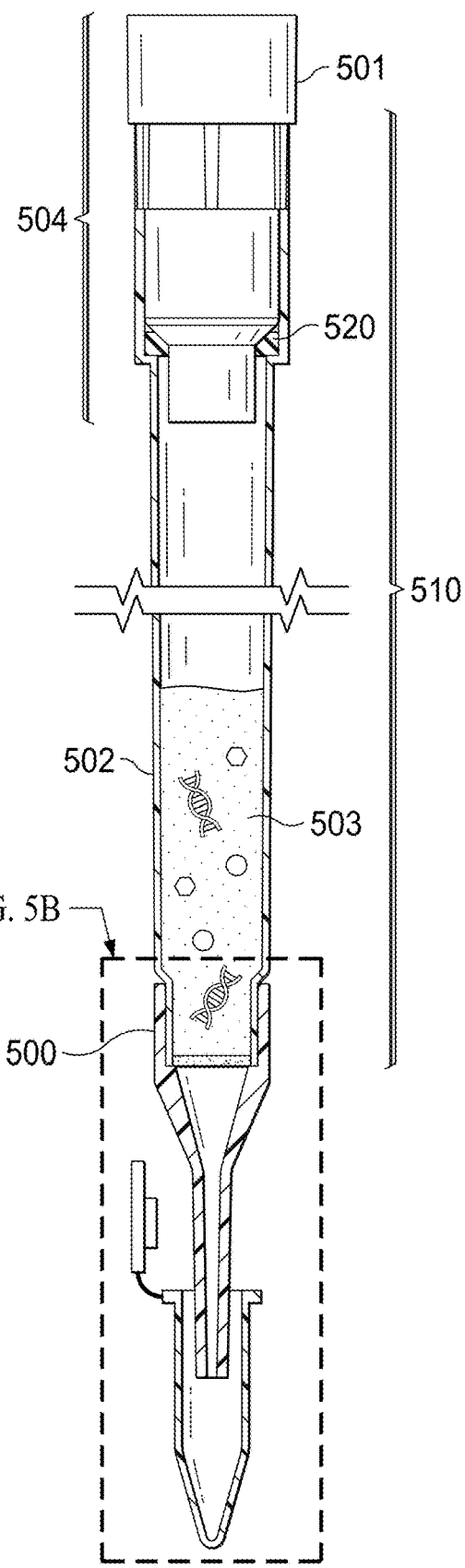
FIG. 4C
FIG. 5A

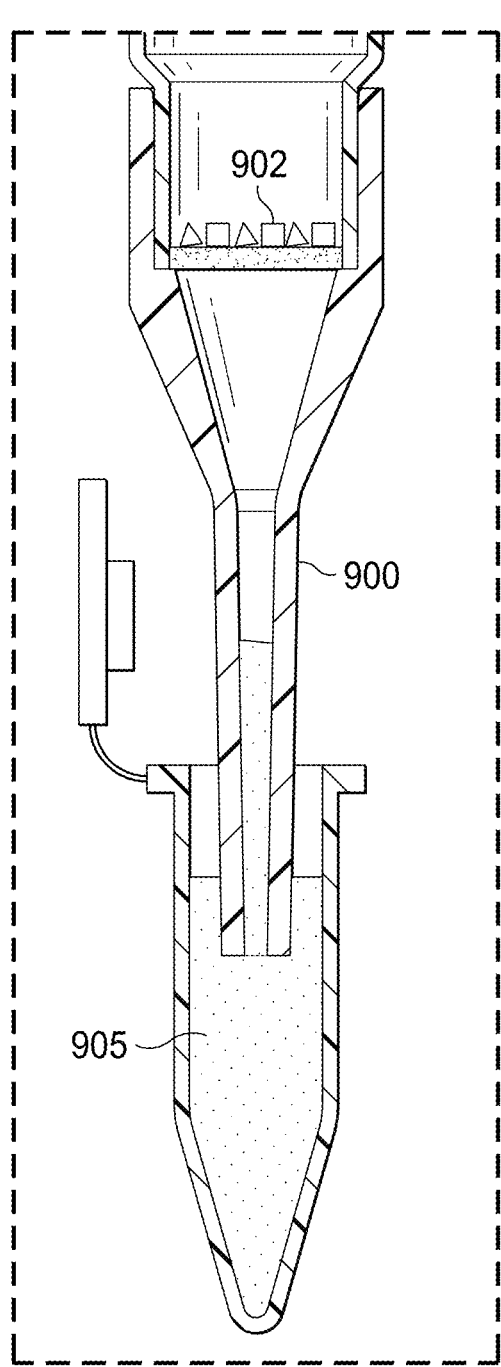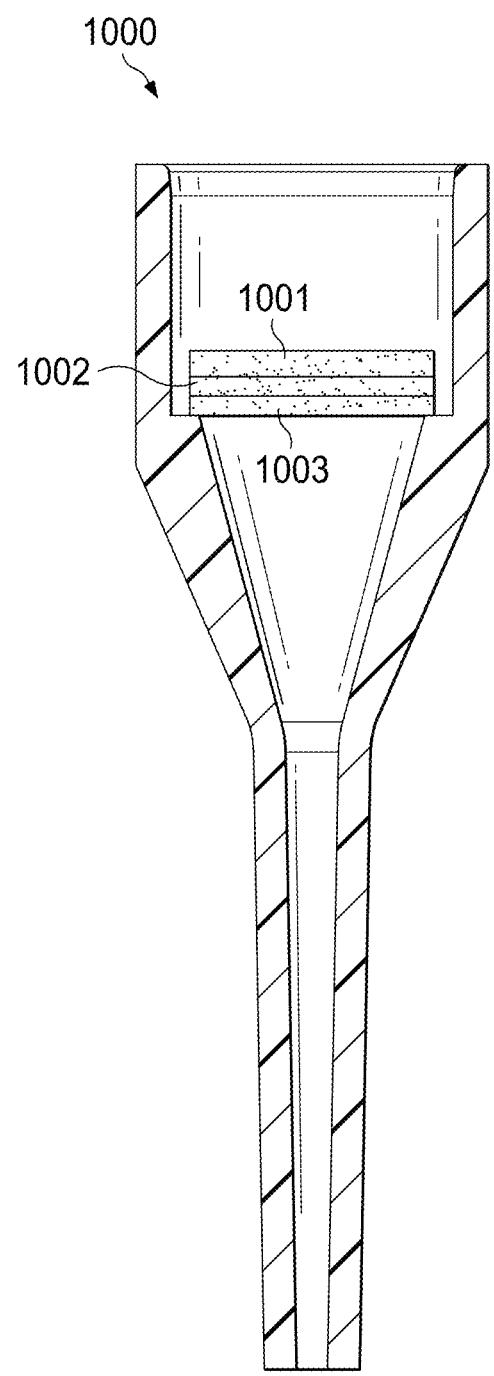
FIG. 9B
FIG. 10

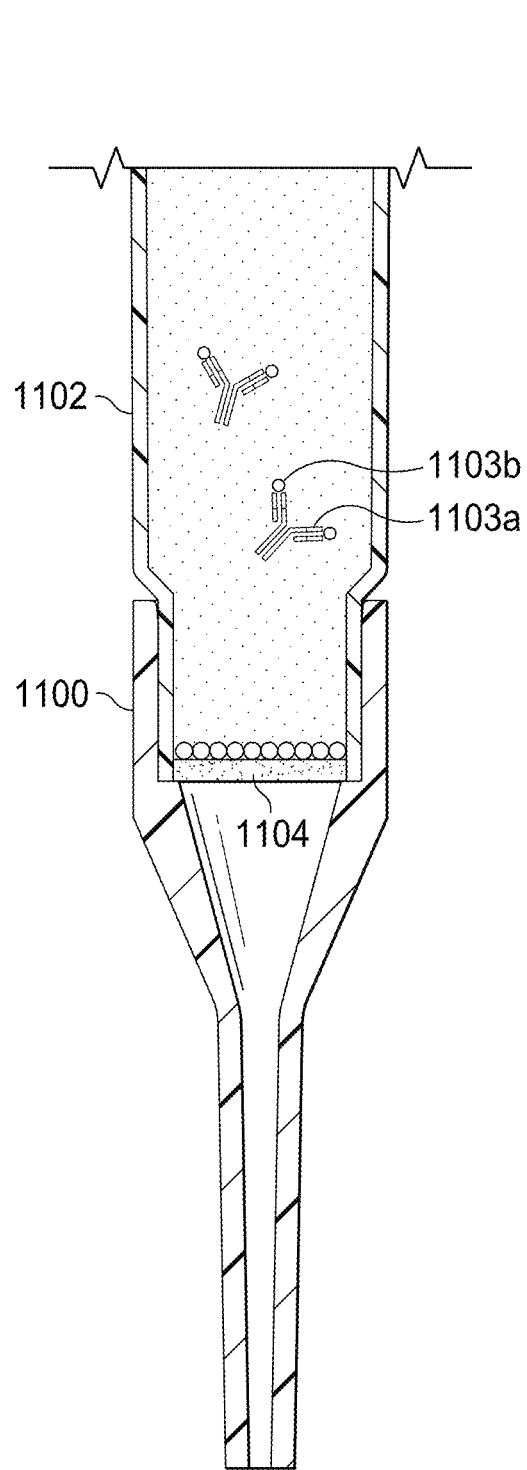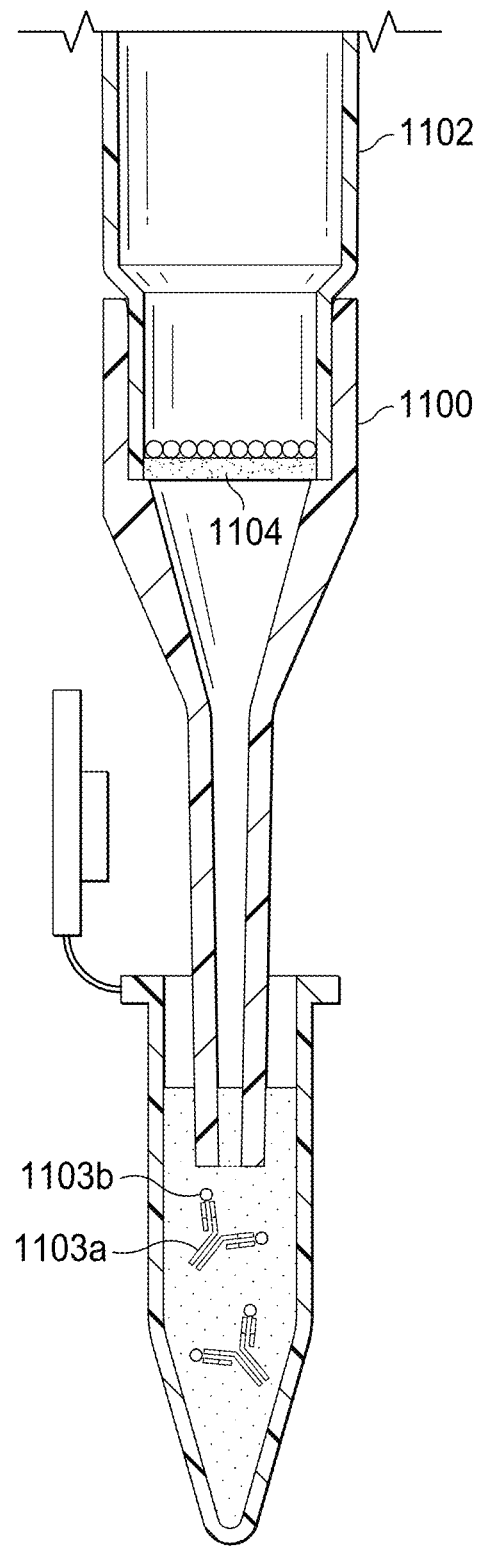
FIG. 11A
FIG. 11B

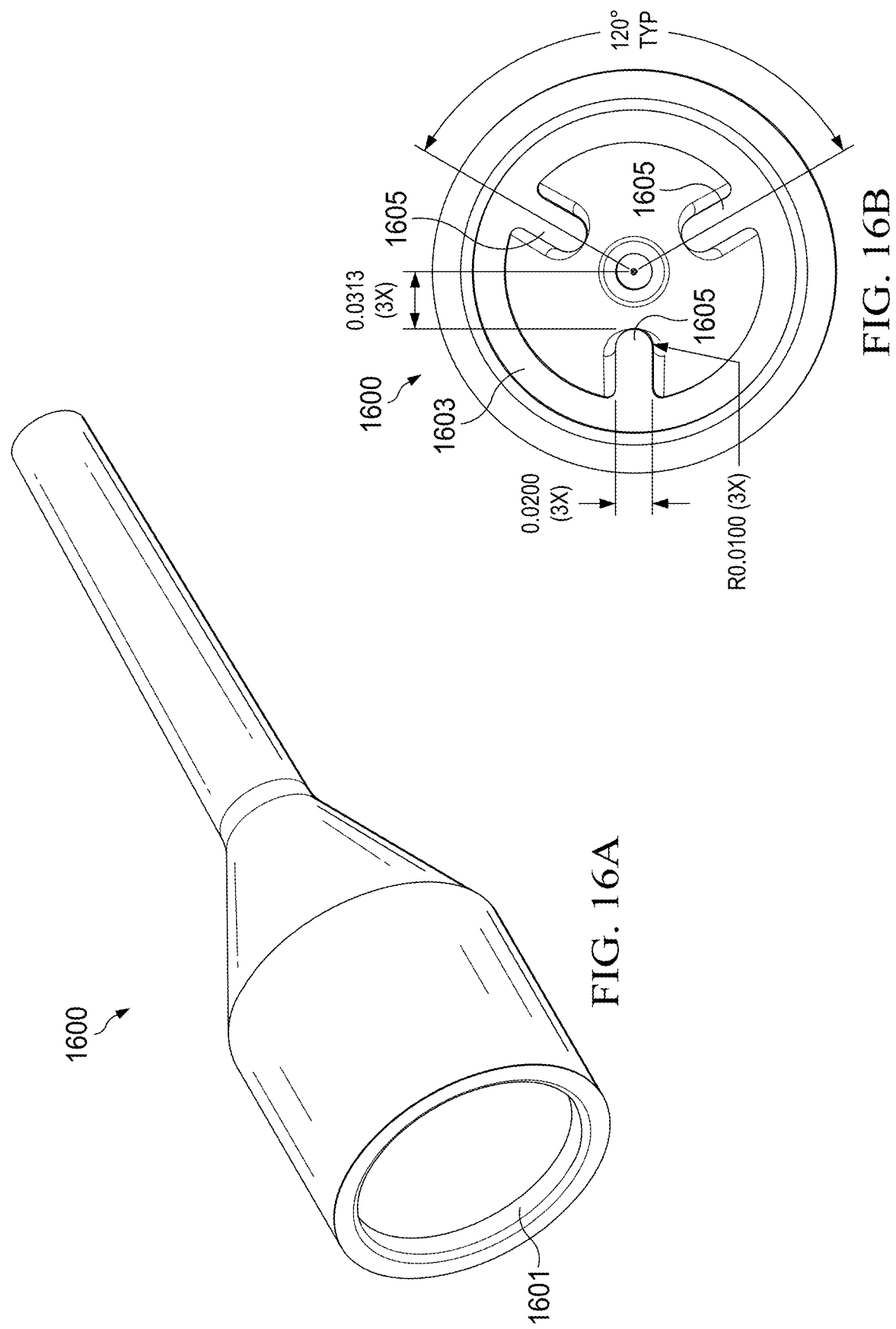

MEMBRANE DEVICES FOR FILTRATION AND EXTRACTION

PRIOR RELATED APPLICATIONS

This application claims prior to U.S. Ser. No. 63/080,396, of the same title and filed Sep. 18, 2020. It is incorporated by reference in its entirety for all purposes.

FEDERALLY SPONSORED RESEARCH STATEMENT

Not applicable.

REFERENCE TO MICROFICHE APPENDIX

Not applicable.

FIELD OF THE DISCLOSURE

The disclosure relates generally to the field of chemical and biological sample preparation. Specifically, devices and methods for filtering and/or extracting sample solutions for DNA or proteins or other target molecules.

BACKGROUND OF THE DISCLOSURE

Numerous commercially available filtration and extraction devices for preparing chemical and biological samples utilize filtration membranes. These filtration membranes are microporous barriers of polymeric, ceramic or metallic materials and are used to separate dissolved materials (solutes), colloids, or fine particulate from solutions.

Some membranes are made to be used with syringes, while others are designed for use with vacuum and/or positive pressure manifolds. For automated, high throughput analysis using robotic liquid handlers, membranes have even been fixed into 96 well plates that are used for extraction or filtration. During use, samples are loaded onto the top of these filtration or extraction plates, which are then loaded onto vacuum blocks or into positive pressure manifolds.

For vacuum systems, collection well plates are positioned under the 96 well filtration/extraction plates in order to collect the eluate for subsequent chemical or biological analysis, or additional sample preparation steps. This means that the vacuum has to be broken, and several mechanical, often user-initiated steps must be taken to move the collection plates in and out of the vacuum box. For positive pressure manifolds, less user-initiated steps are needed. Nevertheless, the manifold must be integrated into the automation platform, and plates must be mechanically or manually moved in and out of the collection position.

For manual filtration performed by a user, commonly available products are syringe filters. These filters use membranes fixed in plastic caps that friction fit and attach to the end of a plastic syringe. The user aspirates the sample solution into the syringe, attaches the syringe filter, and then dispenses the sample solution through the filter by applying positive pressure.

Alternatively, syringe vials can be used for manual filtration. In this product, the sample solution is contained inside a vial. A vial insert, also called a plunger, has a membrane at its distal end for filtration. The vial insert is inserted, or plunged, with pressure into the vial. This causes the solution to move through the membrane and collect inside the insert while the particulate matter remains in the vial.

Other commercially available products incorporate membranes into pipette tips, but have not been useful for filtration of low particle size. The main reason is the membranes must have high pore sizes in order to allow aspiration and dispensing steps of sample solutions through the membranes. For filtration applications, the sample needs to flow in one direction through the membrane to remove particulate matter, which is not intuitive for use with pipette tips and/or robotic liquid handlers.

We recently developed a "tip-on-tip" (ToT) method in WO2018026886 that introduces sample solutions through the wide opening at the top, or hub, of a 'bottom' pipette tip that has a filter therein for filtration. The ToT filtration method can be readily performed using robotic liquid handlers without cross-contamination. These methods prove efficient using porous frits inserted into the 'bottom' pipette tips. For low-particle size filtration applications, fibrous membranes can be placed on top of these frits to allow for the ToT filtration of less than 1 μm particles.

In addition to filtration, silica fibrous membranes for extraction of DNA have been used with the ToT methods. The method for DNA extraction using silica chemistry is known and well published for many years. One of the key steps in DNA extraction using silica is to wash the silica with ethanol, and then dry the silica to remove ethanol prior to elution. Using the silica membranes on the porous frits, three primary issues were found with the ToT method. First, the porous frits retained liquid and made the drying times very long. Second, the use of porous frits led to losses in recoveries. Finally, the frit had to be positioned rather high inside the 'bottom' pipette tip to provide high enough surface area for extraction. This placement results in a lot of dead volume between the frit and the narrow, delivery end of the 'bottom' pipette tip. This dead volume makes it impossible to perform low volume elutions of e.g. 50 μL or less.

Another possible DNA method involves filtration to capture or trap nuclei (or white blood cells) released from a cell membrane lysis solution. If the nuclei (or white blood cells), which are approximately 5 μm in diameter, are separated from the complex sample matrix, the DNA preparation steps are greatly reduced. In U.S. Pat. No. 8,202,693, methods for nucleic acid isolation by separating nuclei are demonstrated. The methods incorporate the lysing of cell membranes in the presence of a solid support, binding intact nuclei to the solid support, and subsequently lysing the nuclei to release (and bind) DNA. The solid support in this method utilizes a binding mechanism where the nuclei bind to the solid sorbent (in this case, magnetic beads), and is separated by use of a magnet. The solid sorbent with bound nuclei can be separated from the complex matrix by containing the sorbent at the bottom of a vial or well (or presumably through centrifugation), and then aspirating the solution with a pipette (possibly after wash steps).

Unlike the binding mechanism used in this prior art, the nuclei can instead be separated by size using porous filtration media that have pores less than approximately 5 μm. In this method, the cell lysed sample solution is passed in a top down procedure with intact nuclei being captured or trapped in the pores of the medium. After sample solution is passed through the filtration membrane, the trapped nuclei are subsequently lysed to release DNA, which is free from complex sample matrices and PCR inhibitors. This means the DNA can be rapidly analyzed using PCR without further purification steps. Using this method with the appropriate buffers allows for the collection of cell free, cytosol and nuclear fractions for direct analyte interrogations.

Thus, there exists a need for new devices that can be easily incorporated into fully robotic methods, and avoids some of the prior art disadvantages. The ideal device can work with a slip tip syringe for easy to use manual processing, or a wide bore pipette tip, or can interface directly with high throughput robotic liquid handlers using a reservoir adaptor. Ideally, the device will have minimal dead volume such that it can be used for small elution volumes and can increase the speed of some filtration and extraction methods. This invention provides one or more of these advantages.

SUMMARY OF THE DISCLOSURE

Disclosed herein is a novel device housing a filtration membrane that can be used to extract and/or filter target compounds in biological or chemical samples. The device, referred to herein as a "membrane device", can be used with slip tip syringes or wide-bore pipette tips for manual separation processes, and can be readily implemented in an automated process for high throughput applications using robotic liquid handlers (RLH). Further, adaptors for use with the membrane device for more RLH control are described. Methods of using the membrane device are also described.

In more detail, the membrane device is generally shaped like Buchner funnel, a wide cylindrical upper portion (proximal end), a conical middle portion, and a narrow cylindrical lower portion (distal end). A ridge, or shelf, is formed at the junction between the upper and conical portions and functions to support the filtration membrane or membranes, as shown in FIG. 1A.

The cylindrically shaped upper portion is sized to fit snugly over the delivery end of a slip tip syringe or wide bore pipette tip by friction to form an air-tight seal, where the syringe or pipette tip fits inside the membrane device and can even function to hold the filtration membrane in place. The ridge of the membrane device, which is part of the upper portion, holds at least one filtration membrane in place in the upper portion. In some embodiments, the filtration membrane is in direct contact with the end of the syringe or wide bore pipette tip when connected.

The ridge is preferably circular in shape (circumnavigating the inside of the tube aka annular) to provide high surface area to the filtration membrane(s), but this is not essential, as a series of separate (e.g., 3-6) shelves could achieve the same effect. However, an annular ridge is preferred as membranes benefit from additional support. Ribs or other cross shapes may be added to the ridge to provide even more support for the membrane(s) to prevent dislodging due to applied pressure. Alternatively, supports separate from the ridge can be incorporated into the upper portion, either above or below the at least one filtration membrane, to hold the filtration membrane(s) in place. Below the ridge, the lower portion of the membrane device is designed to have minimal dead volume to allow for a low volume elution, such as those that are needed for 96 and/or 384 well plates commonly used with RLH.

The present devices and methods include any of the following embodiments in any combination(s) of one or more thereof:

A membrane device, said device comprising: a) an upper portion having an open ended tubular shape with 0-2° taper and an internal diameter that is wide enough for attaching to a separate device, said separate device selected from a wide bore pipette tip, a slip tip syringe or a reservoir adaptor; b) a lower portion below said upper portion, said lower portion being an open ended tubular shape with 0-3° taper; c) an intermediate portion having 45-180° of taper between said upper portion and said lower portion; d) said upper, intermediate and lower portions being in fluidic connection; e) a ridge on an inner surface between said upper portion and said intermediate portion; f) at least one circular filtration membrane located on top of said ridge; g) an optional removable reservoir adaptor that is an open ended tubular element having a distal end configured to fit inside said upper portion and provide a fluid tight fit therewith and an upper end configured to fit a pipette or an RLH; and h) optionally a removable gasket adaptor that is an open ended tube having a gasket coating on a bottommost edge, said low end sized to fit on an uppermost edge of said reservoir adaptor and provide a fluid tight interface therewith.
Any device or method herein described, wherein said upper portion has a 1° taper and said lower portion has a 2° taper or wherein said upper portion has a 1° taper and said lower portion has a 2° taper and having said reservoir adaptor, said reservoir adaptor having a 1° taper at a lower end thereof. Preferably, the devices are small enough to fit in an array for a microtiter plate of 96.
Any device or method herein described, wherein a bottommost edge of said gasket adaptor has an elastomeric coating. The device can be fitted with a gasket that provides a reversible or irreversible seal.
Any device or method herein described, wherein said ridge is annular and has one or more support ribs protruding internally from said ridge for further supporting said at least one filtration membrane.
Any device or method herein described, further comprising a locking washer in the shape of an annular disk located above said at least one filtration membrane for holding said at least one filtration membrane in place.
Any device or method herein described, said device having a plurality of circular filtration membranes located on top of said ridge, or having a two circular filtration membranes and a separation resin therebetween or having being a plurality of membranes with decreasing pore size from a top membrane to a bottom membrane.
Any device or method herein described, wherein the filtration membrane comprises silica, nylon, cellulose, nitrocellulose, polypropylene, polyethylene, polytetrafluroethylene, polyvinylidenefluoride, ceramics, metal, immobilized streptavidin, immobilized biotin, immobilized protein A, immobilized protein G, or combinations thereof.
A kit comprising a container holding a plurality of membrane devices as described herein plus a plurality of wide bore pipette tips or slip fit syringes or reservoir adaptors or gasket adaptors that fit said membrane device or all combinations thereof.
A method for treating a chemical or biological sample, comprising:
a) fitting a separate device into said upper portion or if present said reservoir adaptor or gasket adaptor of any membrane device described herein to form an air tight seal, said separate device selected from a slip tip syringe, a wide bore pipette tip, or an RLH; b) dispensing a chemical or biological sample into said membrane device using said separate device; c) trapping a first portion of said sample in or on said at least one circular filtration membrane; and d) passing a remaining portion of said sample out of said membrane device.

Any method herein described, comprising the further step of eluting said first portion of said sample from said at least one circular filtration membrane, thereby separating said sample into at least said first portion and said remaining portion.

Any method herein described, further including one or more washing steps comprising passing a wash solution through said membrane device.

A method for extracting nucleic acids from a sample, comprising: a) fitting a separate device into said upper portion or if present said reservoir adaptor or said gasket adaptor of any membrane device herein described to form an air tight seal, said separate device selected from a slip tip syringe, a wide bore pipette tip, or an RLH; b) dispensing a sample containing nucleic acid into said membrane device using said separate device; c) trapping said nucleic acid in or on said at least one circular filtration membrane comprising silica; d) passing a remaining portion of said sample out of said membrane device; and e) passing an ethanol solution through said device; f) drying said filtration membrane; g) passing at least one elution buffer for unbinding the nucleic acids from said silica through said membrane device; and h) collecting said elution buffer and nucleic acids into a separate sample collection vial. In one embodiment, the nucleic acid is DNA.

Any method herein described, further including a PCR amplification step to amplify said nucleic acid and a detection step to detect said amplified nucleic acid or any further purification or analysis steps.

Another method of isolating DNA from a cell sample is similar, but uses a cell lysis buffer to lyse cells and trap nuclei on a membrane of <5 microns. Yet another method swells cells in water, and traps the whole cell. This is useful to isolate white blood cells and remove sera and red blood cells and the like from whole blood. The nuclei or whole cell can then be lysed to release DNA.

Any method herein described that does not use the herein described devices, but instead uses any prior art or future developed devices. In particular, the methods of trapping cells (e.g., WBC) and or nuclei which can be performed with any filtration devices, and need not be limited to the devices described herein.

While multiple embodiments are disclosed, still other embodiments will become apparent to those skilled in the art from the following detailed description. As will be apparent, certain embodiments, as disclosed herein, are capable of modifications in various aspects, without departing from the spirit and scope of the claims as presented herein. Accordingly, the drawings and detailed description are to be regarded as illustrative in nature and not restrictive.

The term "pipette tip" is a term of art, and refers to a conical tube with a larger end, called the "hub" herein, and a narrow end that is precisely engineered for accurate sampling and delivery of fluids. The hub fits over the barrel of the pipette, also called a pipettor, or robotic liquid handler, typically by friction fit. The interior diameter of the pipette tip's hub must be slightly larger than the barrel of the pipette and the inside taper of the pipette tip must also match the taper of the pipette's barrel. Most manufacturers of hand held pipettes and robotic liquid handler systems make pipettes that will utilize universal tips. The hub is located at the proximal end of the pipette tip and the narrow end is located at the distal end.

The pipette tip fits onto the barrel of the pipette, or a micropipette if measuring small volumes (<1 mL), in an air-tight manner, such that when the plunger of the pipette is pressed and released, a vacuum is applied, and fluid is pulled into the pipette tip. That fluid can be delivered or dispensed to any receptacle as needed by again depressing the plunger.

The term "delivery end" as applied to pipette tip or syringe or the devices described herein refers to the "distal" end (opposite of the hub) from which fluid is dispensed, and is not intended to imply any particular shape. It may also be referred to as the "bottom" end. The wide upper end is called "proximal" herein, as it is the end closest to the pipette and/or handler. The proximal ends is at the "top" of the device.

A "robotic liquid handler" or RLH is a robotic system, used for automation in chemical or biochemical laboratories that dispenses a selected quantity of reagent, samples or other liquid to a designated container. The simplest version can dispense an allotted volume of liquid from a motorized pipettor or syringe; more complicated systems can also manipulate the position of the dispensers and containers (often a Cartesian coordinate robot) and/or integrate additional laboratory devices or add-ons, such as microplate readers, heat sealers, heater/shakers, bar code readers, spectrophotometric or separation devices and instruments, storage devices, waste containers and incubators. In addition to the motorized pipettor or syringe, robotic liquid handlers also have trays for sample wells or trays for holding sample vials, trays of pipette tips that fit the pipettor, and containers of solvents.

The methods described herein require a robotic liquid handler capable of manipulating the position of pipette tips on the Cartesian, 3-axis movements, typically implemented by means of an arm, and having multi-pipetting capabilities. To further reduce human interaction, it is also desirable to have spectrophotometric or separation instruments integrated with the handler.

Exemplary robotic liquid handlers include the STAR® or STARLET® or NIMBUS® from HAMILTON COMPANY®; BRAVO® Automated Liquid Handling Platform from AGILENT®; the EPMOTION® from EPPENDORF®; the BIOMEK® 4000 or NX™ or FX™ from BECKMAN COULTER®; the PIPETMAN® from GILSON®; the FREEDOM EVOR from TECAN®; and PAL™ systems from CTC™ or the MPS™ from GERSTEL®, which are capable of being modified to perform pipetting and integrated with a variety of separation-mass spectrometric instruments. However, any commercially available robotic liquid handler can be used and/or modified to perform the disclosed separations.

The term "robotic pipette tip" is a pipette tip whose inner taper in the hub is such as to fit a robotic liquid handler. Most frequently there is no difference between a robotic pipette tip and a pipette tip for a hand held micropipette, but there can be size differences.

The term "wide bore pipette tip" refers to a pipette tip that has a cylindrical shape at its narrow, delivery end as opposed to a conical shape, with the orifice at the narrow end being slightly larger than typical pipette tips. The wide bore opening at the delivery end is generally between 2 and 5 mm in internal diameter and slightly larger (1-2 mm) externally. Further, the wide bore pipette tip usually has a hub capable of fitting a standard pipettor or robotic liquid handler.

The term "membrane device" or "filtration device" as used herein refers to a generally Buchner funnel shaped device with a membrane filter fitted therein on top of a ridge to support the membrane. Unlike a Buchner, the filter is not integral to the device, but is added thereto during manufacturing.

In more detail, the membrane device has a wide cylindrical tube upper portion and a tapered middle portion, with a ridge or shelf formed therebetween. A fluid delivery lower end is a narrow cylinder, and all three portions are all fluidly connected. At least one membrane is fitted in the upper portion supported by the ridge, immediately above the beginning of the tapering of the device. The body of the device is preferably made of plastic, e.g., by precision injection molding, and the filter itself can be a variety of materials.

The wider upper tubular portion is sized to fit over the delivery end of a slip tip disposable syringe or a wide bore pipette tip or a reservoir adaptor for a pipettor or robotic liquid handler by friction fit. Herein, we have sized our devices to work with Hamilton RLH systems. The membrane device fits onto the end of the 1 mL Hamilton wide bore pipette tip. The reservoir adaptor is also designed to be used with the Hamilton RLH system, which has similar dimensions and design as the Hamilton pipette tips. However, different size devices may be manufactured to be used with different RLH systems by other manufacturers. The interior surface of the upper tubular portion of the membrane device may have a very slight amount of taper (~1°) such that the membrane device snugly fits onto other devices in an air-tight manner.

The middle portion and lower portion are sized to limit the dead volume below the filtration membrane, thus the tapered region tapers quite strongly and the lower portion is quite narrow. The lower portion may have a slight taper to provide air-tight friction fits to other devices.

The term "tubular" here refers to a hollow tube of cylindrical shape with open top and bottom ends. A very slight amount of taper (0.5-3°) may be included as this allows a good friction fit and yet still visually presents as a cylinder.

As used herein, "taper" refers to the degree to which the sides are not perfectly parallel. One way to measure taper, especially of small parts where there is complete accessibility as here, is to simply measure the angle between the two walls of the tube and report that in angular degrees. Pipette tips typically have a taper of about 1° at the hub, but may have a greater taper) (2-3° at the delivery end.

A "slip tip syringe" has a simple tubular dispensing end with a very slight amount of taper, and there are no threads, such as are found in a Luer lock syringe.

By "irreversible" seal what is meant is that the seal is strong enough to allow the entire device to be lifted from above the seal, without the seal breaking. The seal is robustly formed by friction fitting or pressing of materials together. Materials that can provide such a seal include plastic and rubber gaskets with tubular shapes which help take the shape of the parts being combined. A "reversible" seal however, is one that is fluid-tight while a downward force is used, but can be broken manually or by machine by simply lifting the device. Materials that can provide such a seal include o-rings and flat rubber gaskets.

The terms "membrane" or "filtration membrane" are used interchangeably herein to refer to a thin pliable sheet of material that acts as a barrier. The membrane may have a thickness that range from 0.01 mm to over 1 mm. In this application, the membrane can be used for filtration or directly for extraction, or to contain solid phase sorbent (positioned between 2 membranes). The membrane can be placed inside the main body of the membrane device during manufacturing using means known in the art.

The terms "resin" and "sorbent" are used interchangeably to refer to extraction media. The extraction media can be dry and in the form of particles or beads. Alternatively, the extraction media can be water—or buffer—swollen to form a gel matrix having pores either larger or smaller than the analyte.

As used herein, the term "target compounds" refers to the compounds that are being separated from the sample for analysis using either filtration or extraction or extraction media. In some embodiments, the target compounds can include biomolecules, particularly biological macromolecules such as DNA, RNA, proteins and peptides, polynucleotides, lipids and polysaccharides. The target compounds may also include small chemical molecules.

As used herein, the term "elution buffer" or "elution solvent" refers to a solution that is used to unbind target compounds from the filtration membranes or resin. The elution buffer is selected such that it interferes with the e.g. ionic, hydrophobic, or hydrogen bonding between the target compound and the membrane or resin.

As used herein, "air-tight" or "fluid-tight" is used to describe the seal between the membrane device and the syringe or wide bore pipette tip or reservoir adaptor, and simply means that no fluids (e.g. air) passes at this point of contact. The flow of fluids is instead directed through the membrane contained within the membrane device.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim. The phrase "consisting of" is closed, and excludes all additional elements. The phrase "consisting essentially of" excludes additional material elements, but allows the inclusions of non-material elements that do not substantially change the nature of the invention. Any claim introduced with the transition phrase "comprising" may be changed to "consisting of" or "consisting essentially of" and vice versa. However, the claims are not repeated herein with each possible transition phrase in the interests of brevity.

The following abbreviations are used herein:

| ABBREVIATION | TERM |
|---|---|
| RLH | Robotic liquid handler |
| SPE | Solid phase extraction |
| ToT | Tip-on-tip |
| RBC | Red blood cells |
| WBC | White blood cells |

BRIEF DESCRIPTION OF THE DRAWINGS

FIG. 4A-C displays a membrane device attached to a wide bore pipette tip for providing sample solutions and solvents to the membrane device. In these figures, the extraction of DNA is shown.

FIG. 5A-C displays an adaptor-on-tip method for providing sample solutions to the top wide opening end of filtration and extraction pipette tips without concern of cross-contamination. In these figures, the extraction of DNA is shown using the adaptor-on-tip method.

FIG. 9A-B displays a membrane device that is used for removing solid particulate matter (denoted by triangles and squares).

FIG. 10 displays a stack of membranes in the membrane device for more efficient filtration with varying porosities of membranes.

FIG. 11A-D displays a membrane filtration device attached to a wide bore pipette tip for providing sample solutions and solvents to the device for an immunoassay screening procedure. In these figures, a positive immunoassay procedure (FIG. 11A-B) is shown, along with a negative result (FIG. 11C-D).

DESCRIPTION OF EMBODIMENTS OF THE DISCLOSURE

The invention provides a novel device for filtration or extraction procedures using separate devices such as syringes, wide bore pipette tips or reservoir adaptors for manual and automated processes (RLH systems). The novel device forms an air-tight, friction fit seal with the separate device such that liquid solutions are dispensed from the delivery end of the separate device into the device, where they can be pushed through the membrane and into a receptacle.

In more detail, the membrane device is a generally cylindrical shaped tube having a wide upper or proximal tubular portion, a short tapered middle and a narrow lower or distal tubular portion. This allows for the formation of a ridge, or one or more shelves, where the upper and middle portions meet and which function to support the membrane. The lower portion of the membrane device has a smaller internal diameter than the wide upper portion, the tapered middle portion therebetween, much like a Buchner funnel shape as shown in FIG. 1A or B.

The upper portion is designed to fit over the delivery end of a separate device, such as a slip tip syringe, a wide bore pipette tip or a reservoir adaptor and form an air-tight, friction fit. The at least one membrane may be in direct contact with the end of the separated device when that device is being used, but this is not necessary and in some embodiments, an annular disk, called a "locking washer" herein may be placed on top of the membrane to hold the membrane in place instead. This locking washer could then be in direct contact with the end of the separate device or be free if the fits are such that the separate devices do not reach in so far.

Figure 1A:
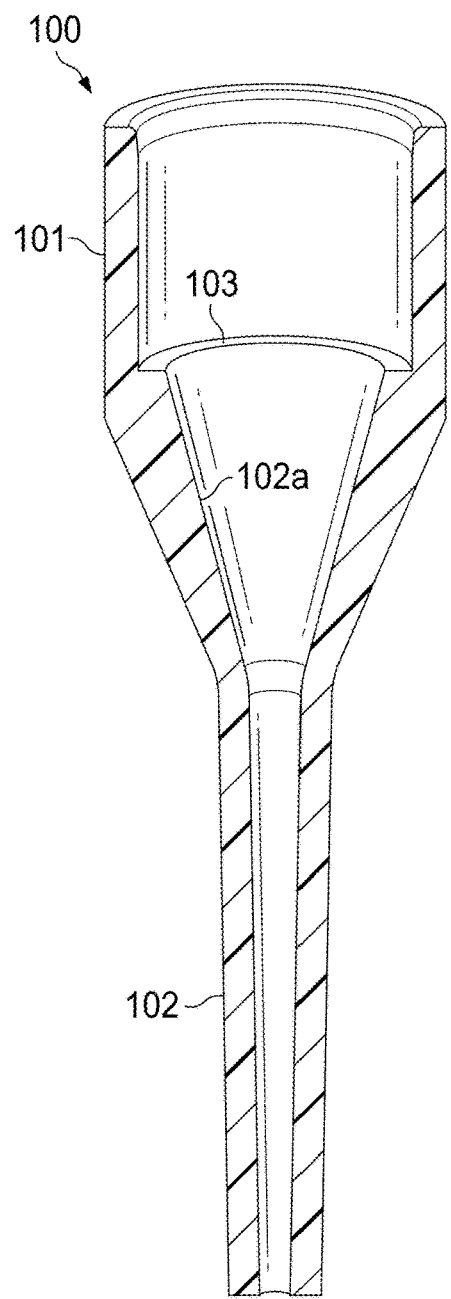
FIG. 1A-C displays a side view (FIG. 1A), a cross section of the side view (FIG. 1B), and a top view (FIG. 1C) of one embodiment of the presently disclosed membrane device.
Figure 1B:
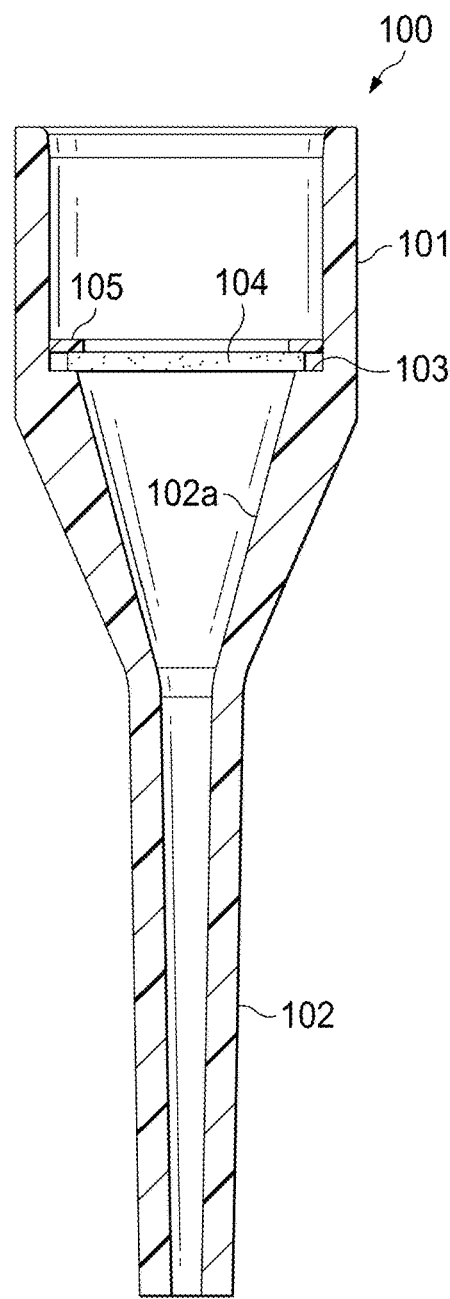
Figure 1C:
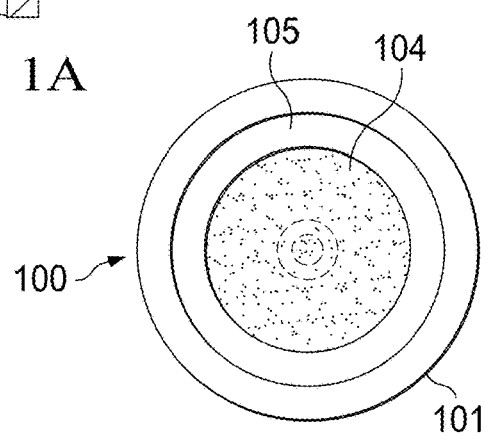

FIGS. 1A-C display one embodiment of the presently disclosed membrane device 100. The membrane device 100 is a generally cylindrical shaped tube that has a wide upper portion 101 and a cylindrical, narrow lower portion 102, with a short tapered middle section 102a joining the two. Ridge 103 is located at the bottom of the upper portion and abutting the middle portion 102a. At least one circular-shaped filtration membrane 104 is positioned on top of the ridge 103 in the upper portion 101, thus the internal diameter of the ridge is sized such that there is enough surface area to hold the filtration membrane 104 in place.

Figure 2A:
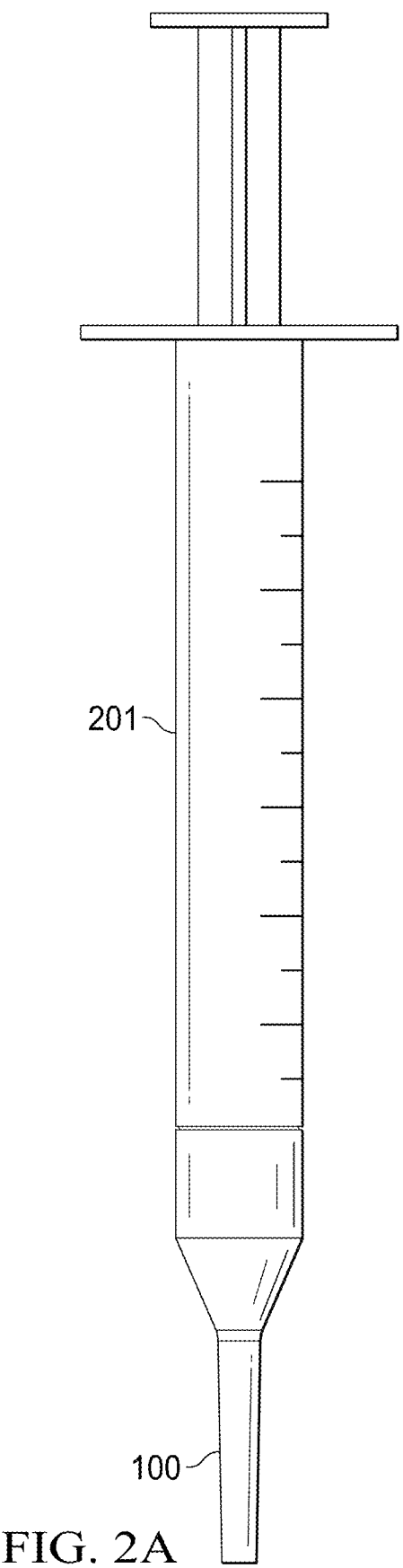
FIG. 2A-B displays an embodiment of a membrane device attached to the end of a slip tip disposable syringe (2A), and attached to the end of a wide bore robotic pipette tip (2B).
Figure 2B:
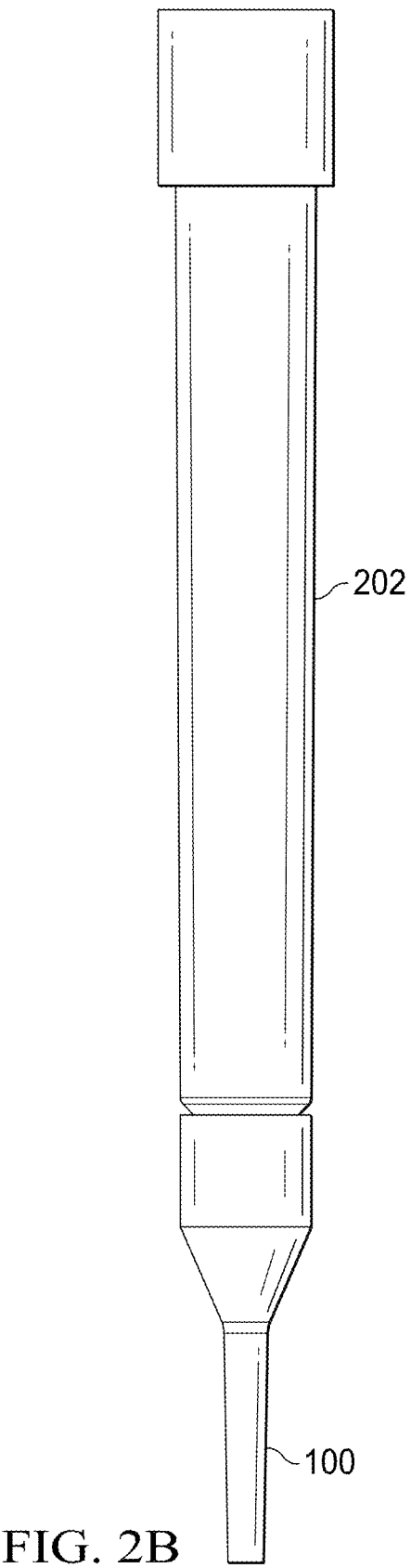

The upper portion 101 has an internal diameter wide enough that the upper portion fits snugly onto the delivery end at the end of a slip tip syringe 201 or wide bore pipette tip 202 (FIG. 2) or a reservoir adaptor. In most applications, an upper portion with an internal diameter of about 4 to 5 mm will be able to friction fit into the delivery end of most commercially available disposable syringes or 1 mL Hamilton® brand wide bore pipette tip. However, the internal diameter can be made larger or smaller as needed for different machines or devices. Ideally, the devices are sized to be used in an array of devices that match a given microtiter plate.

The upper portion 101 of the membrane device fits onto the barrel of a slip tip syringe or pipette tip in an air-tight manner, such that when the plunger of the syringe or pipette is pressed, pressure is applied, and fluid contained within the syringe or pipette tip can be passed through the membrane of the membrane device and delivered to any receptacle as needed. Likewise, the RLH can apply pressure in the same way.

In some embodiments, the tapering of the middle portion 102a and lower portion 102 may be continuous, like that of a pipette tip. However, it is preferred that the lower portion 102 of the membrane device mimics the extremely narrowed diameters and slight tapered shape of a syringe needle, for accurate and precise delivery into very small wells. Here, the funnel shaped area 102a immediately below the ridge has significant tapering (about) 120° until a target diameter is reached, at which point the remaining length of the lower portion 102 has a slight taper) (1-2° or no taper.

The filtration membrane 104 is circular in shape, so the ridge 103 must have a smaller inner diameter than the filtration membrane to hold it in place. As an example, if the internal diameter of the upper portion is 5 mm, a ring-shaped ridge can extend 1 mm therefrom, giving an internal diameter of 3 mm. The filtration membrane can then have a diameter of greater than 3 mm and up to almost 5 mm. The locking washer 105 should also have a larger diameter than the inner edge of ridge 103, yet still fit inside the upper portion.

Any material normally used for filtration members can be used in the membrane device, including but not limited to, fibrous material (cellulose, nitrocellulose, silica), plastics (e.g. polyethylene, polypropylene, polytetrafluroethylene (Teflon), or polyvinylidenefluoride), metal (e.g. stainless steel), glass, and/or ceramics (e.g. alumina, titania, zirconia oxides, and silicon carbide). Further, the membrane can be a film or fibrous sheets of material.

In some embodiments, the material for the filtration membrane is selected such that it interacts with a target compound in the sample solutions. Thus, the filtration membrane 104 is chosen such that it retains or binds the target compound in the sample solutions using e.g. ionic, hydrophobic, or hydrogen bonding. Alternatively, the material may be selected such that it does not interact with the target compound, but does retain or bind with the non-target compound or other matrix components through various binding mechanisms or by selective filtration via the pore size of the filtration membrane.

In some embodiments, the filtration membrane is prepared from a silica fibrous material; alternatively, it can be made of nylon, cellulose, nitrocellulose, polypropylene, polyethylene, polytetrafluroethylene, or polyvinylidenefluoride. Porous ceramics or porous metals such as stainless steel can also be used for filtration and/or support, provided they are thin enough. In some embodiments, membrane may also comprise immobilized streptavidin, biotin, protein A, protein G, protein A/G, or other proteins and antibodies. These proteins and antibodies can be immobilized by covalent attachment to a base material of the filtration membrane, or simply by adsorption to the surface of the filtration membrane.

A variety of pore sizes of the membrane can be used, depending on the application and/or size of compounds that will be retained in the membrane device. In some embodiments, the pore sizes are between about 0.5 µm to about 20 µm, 0.5-4 µm, 0.-2.5 µm, 1-3.5 µm, or about 2-4 µm. Alternatively, the pore sizes can be about 0.7 µm, 1 µm, 1.6 µm and 2.5 µm.

The thickness of the filtration membrane will vary depending on the application for the membrane device. It can be as thin as about 0.01 mm in thickness or as wide as about 1 mm in thickness. In some embodiments, a stack of filtration membranes with thicknesses between 0.1-0.5 mm are used instead of a single membrane with a thickness greater than 0.75 mm. In these embodiments, the characteristics of the stacked membranes can vary to aid in separation. For example, the top may be a larger pore size, pore sizes diminishing with each lower membrane.

A pore size of about 2.5 µm or greater provided the least resistance to flow, i.e. had the highest flow rate with specific applied pressure. However, larger pore sizes had lower recoveries of certain target compounds such as DNA. A filtration membrane with a pore size of about 1 µm and a thickness of about 0.5 mm was found to work with a broad range of target compounds. For DNA, the best recoveries were observed when using a silica fibrous material to form a filtration membrane that was about 0.5 mm in thickness with 1 µm pore size.

The surface area of the filtration membrane is exposed as much as possible to the solutions being added to the membrane device to obtain higher extraction efficiencies and surface area contact. However, the filtration membrane can be dislodged if relatively high pressures are applied due to pores of the membrane being clogged. As such, the shape of the ridge can be modified to provide additional support to the membrane, especially for high-pressure applications.

Figure 3A:
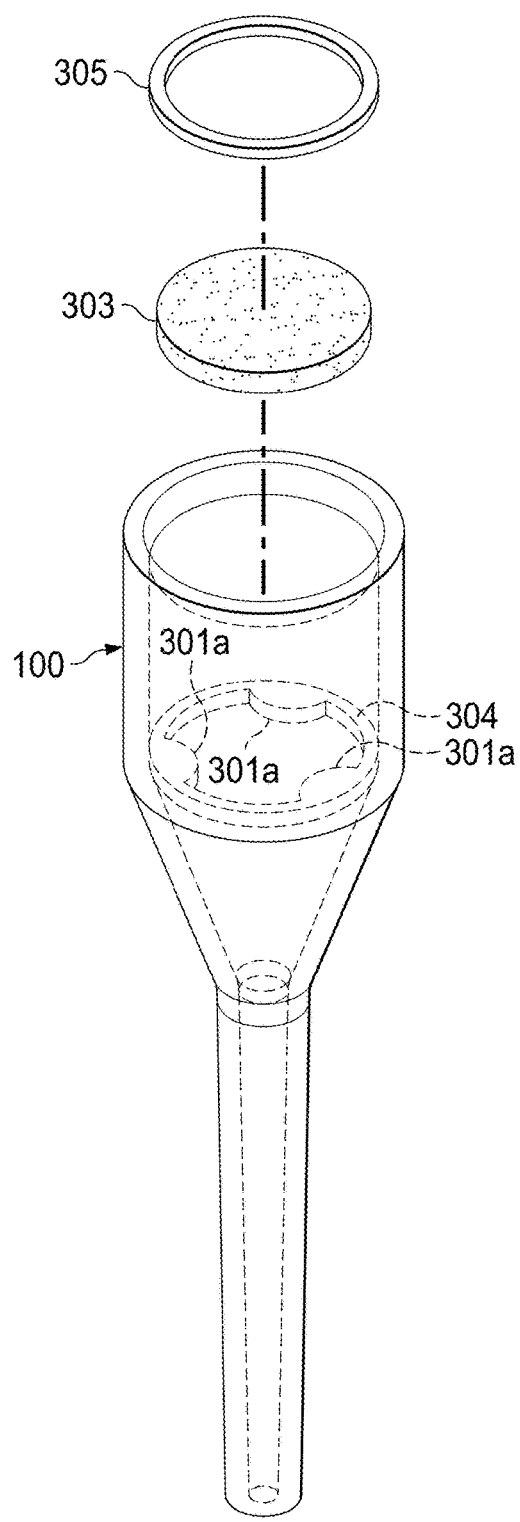
FIG. 3A displays a cut through exploded view of the ridge area, so that annular ridge with support ribs, and filter are more easily viewed. Also shown is an optional locking washer that may be provided with certain embodiments of the membrane device.
Figure 3B:
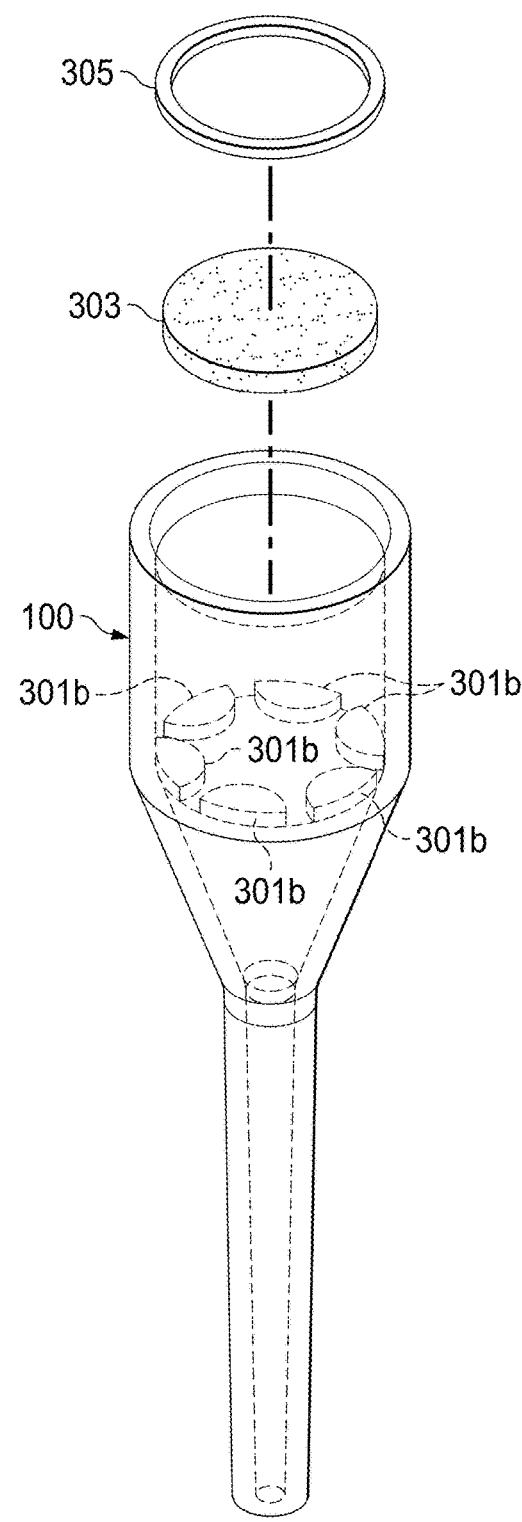
FIG. 3B shows 6 ribs supporting the filter, which may be suitable for membranes that need more support.

A more robust design for the ridge is shown in FIG. 3A wherein ridge 304 has three support ribs 301a to prevent the membrane 303 from sliding and dislodging. In this particular embodiment, the ridge has three ribs 301a at 120° from each other, with the ribs protruding about 0.5 mm in length and thickness. However, the number of ribs, the spacing of ribs and the protruding length of ribs can be varied as needed. Thus, it is also possible to design the device to have two, four, or more ribs of any length on the ridge, although three ribs are sufficient for most applications. Locking washer 305 which is an annular disk sits above the filter 303. FIG. 3B shows a variation where 6 ribs 301b are used instead of an annular ridge. However, the annular ridge with ribs is preferred as providing the most support.

Figure 3C:
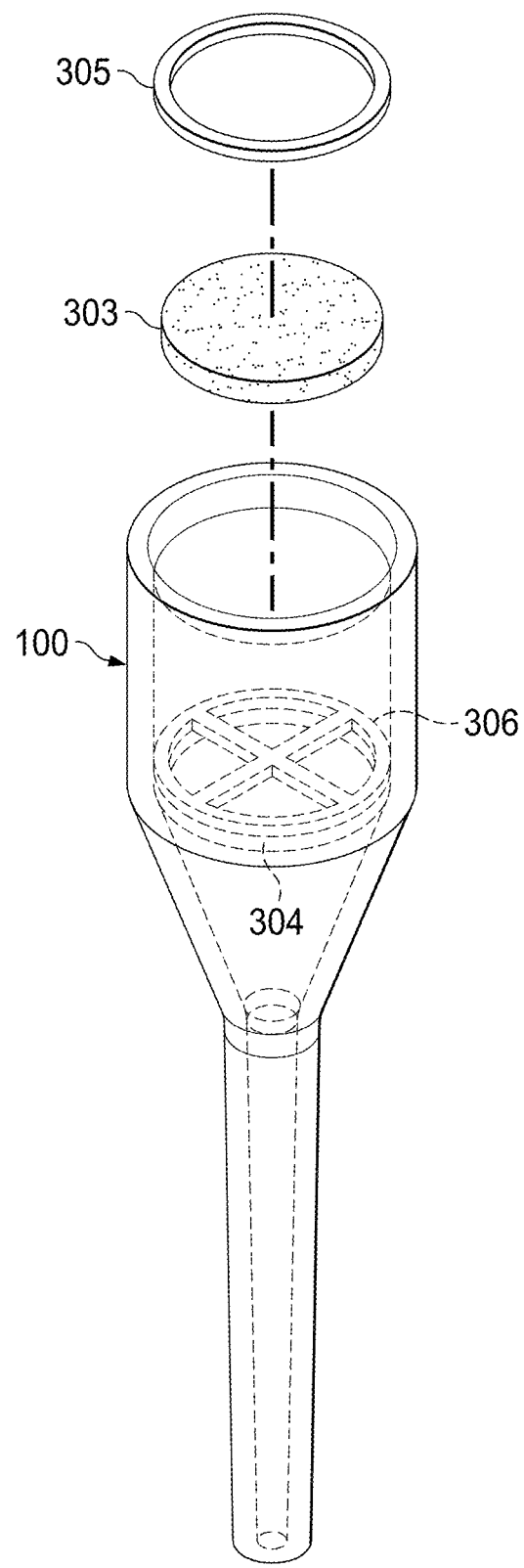
FIG. 3C shows another embodiment with cross bars for more support.

It is also possible to design cross hairs on the ridge so that there is support across the center of the membrane. These supports can be an integral part of the device, or they could be added as separate parts that fit on top of the ridge and below the filtration membrane(s), or above the filtration membrane(s). FIG. 3C shows support 306 shaped like an annular ring with a pair of cross bars is placed above the ridge 304. Although able to provide significant support, in our experience, these additional support structures are not needed at these smaller size ranges. In some embodiments, extra supports are placed on top of the upper most filtration membrane such that the extra supports contact the delivery end of the syringe or wide bore pipette tip. In yet other embodiments, a locking washer placed on top of the membrane is used in combination with extra supports above or below the membrane.

The length of the membrane device can vary depending on its application; however, the length of the lower portion is limited to minimize the dead volume. Further, the length of the lower portion and upper portion of the membrane device may be the same or different, with either portion capable of being longer or shorter than the other. The length of the funnel shaped area 102a of the middle portion below the ridge is minimal and is often about 1.0 mm. In some embodiments, the total length of the membrane device is between about 1.0 to 5 cm. Alternatively, the length of the membrane device is between about 1.5 cm and about 3 cm; or between about 2 and about 4 cm; or between about 3.5 and 5 cm.

In some embodiments, the membrane device is no longer than about 2 cm in length. This allows for the upper portion of the membrane device to be about 5 mm in length above the ridge, to allow for the placement of the membrane or stack of membranes with enough length to obtain a suitable friction fit on the syringe or pipette tip or reservoir adaptor. The length of the lower portion, below the ridge is about 1.5 cm or less to reduce dead volume. Alternatively, the length of the lower portion can be between about 0.5 to 1.5 cm in length.

In other embodiments, the membrane device is about 5 cm in length. This allows for the upper portion of the membrane device to be about 3.5 to 4.5 cm in length above the ridge, to allow for the placement of solid phase extraction (SPE) sorbent between two or more membranes with enough length to obtain a suitable friction fit on the syringe or pipette tip. The length of the lower portion, below the ridge can be about 0.5 to 1.5 cm or less to reduce dead volume.

The external diameter of the membrane device will be the widest in the upper portion to allow for a large enough inner diameter to fit over a separate device such as a slip tip syringe, wide bore pipette tip or reservoir adaptor. As the inner diameter of the upper portion will be between 4 and 5 mm, the outer diameter of the upper portion can be between about 5 and about 8 mm.

In some embodiments, the tapering is similar in shape to a pipette tip and may have an external diameter between 0.75 to 1.5 mm at its narrowest point. Preferably, however, the lower portion may be designed like a syringe needle for accurate and precise delivery into small wells, such as a 96 or 384 well plate, and would have an external diameter between 0.5 to 1.0 mm at its narrowest point. The internal diameter of the lower portion may be between about 0.1 and 0.5 mm in diameter at the most narrow point to minimize the dead volume inside.

In some embodiments, the membrane device is attached to a reservoir adaptor that is accessible by the RLH, negating the need to use a syringe or attached wide bore pipette tip. In particular, the distal end of the reservoir adaptor has the same dimensions as the delivery end of a wide bore pipette tip such that it forms an air-tight friction fit with the membrane device. Similarly, the proximal end of the reservoir adaptor has the same dimensions as the proximal hub end of a wide bore pipette tip such that the reservoir adaptor can form a reversible air-tight connection with the RLH.

The RLH can pick up and move the membrane device via its reservoir adaptor around the RLH platform, which allows for a fully automated process. For example, a user will not have to manually exchange the waste solvent container under the membrane device with a sample well plate. Instead, the RLH can move the membrane device from a rack over the waste container to a rack over a sample well. Additionally, the RLH can dispense solvents through the reservoir adaptor and into the membrane device, where the solvents can drain via gravity or with the aid of a vacuum or positive pressure.

The portion between the proximal and distal end of the reservoir adaptor can vary, and serves only to provide a volume of space for holding fluid that is greater than would be found with the membrane device alone. However, preferably the reservoir adaptor is compact in size (2-5 cm) such that it does not affect the RLH's accuracy and precision in moving the membrane device along the RLH's 3-axis coordinate system.

In some embodiments of the membrane filtration device that is attached to a reservoir adaptor, a second gasket adaptor in the form of an open tube with gasket coating at a bottommost end forms a reversible or irreversible seal at its distal end with the proximal end of the reservoir adaptor. The proximal end of the gasket adaptor is also accessible by the RLH. The gasket adaptor may be needed for extractions or filtrations in order to prevent cross-contamination of chemical and biological samples, as explained below in FIG. 6. The use of the gasket adaptor is not limited to the reservoir adaptor, but the distal end of the gasket adaptor has the same dimensions as the hub of a RLH pipettor such that it can be attached to any device that fits onto the RLH. The proximal or bottommost end has a gasket coating such that it can meet the uppermost end of the membrane device and adhere. In some embodiments, the gasket adaptor can be used with the wide bore pipette tip to form an adaptor-on-tip device (FIG. 5). In some embodiments, the gasket adaptor has the same dimensions as the reservoir adaptor, except it has a gasket on its proximal end.

Figure 4A:
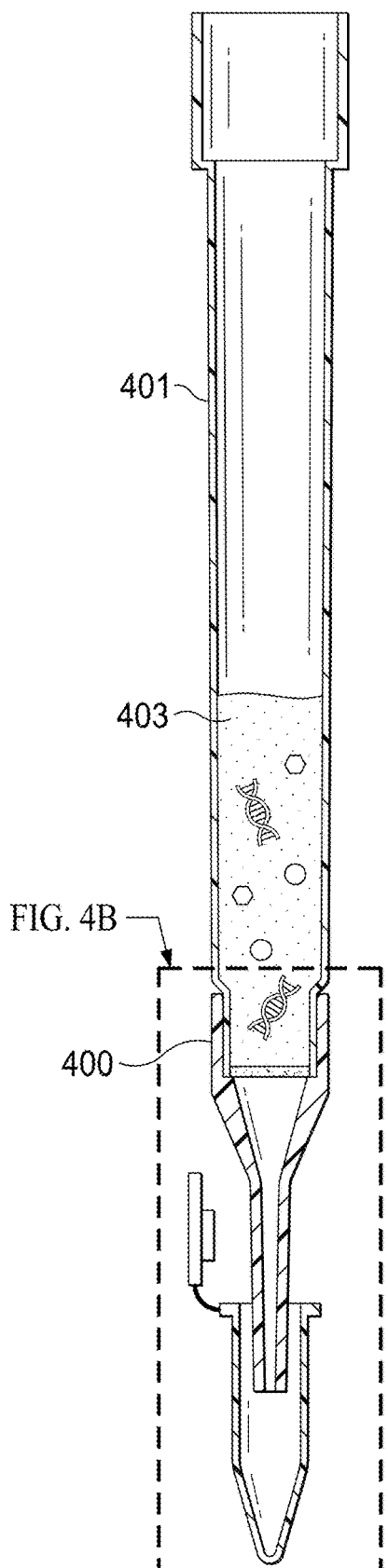
Figure 4B:
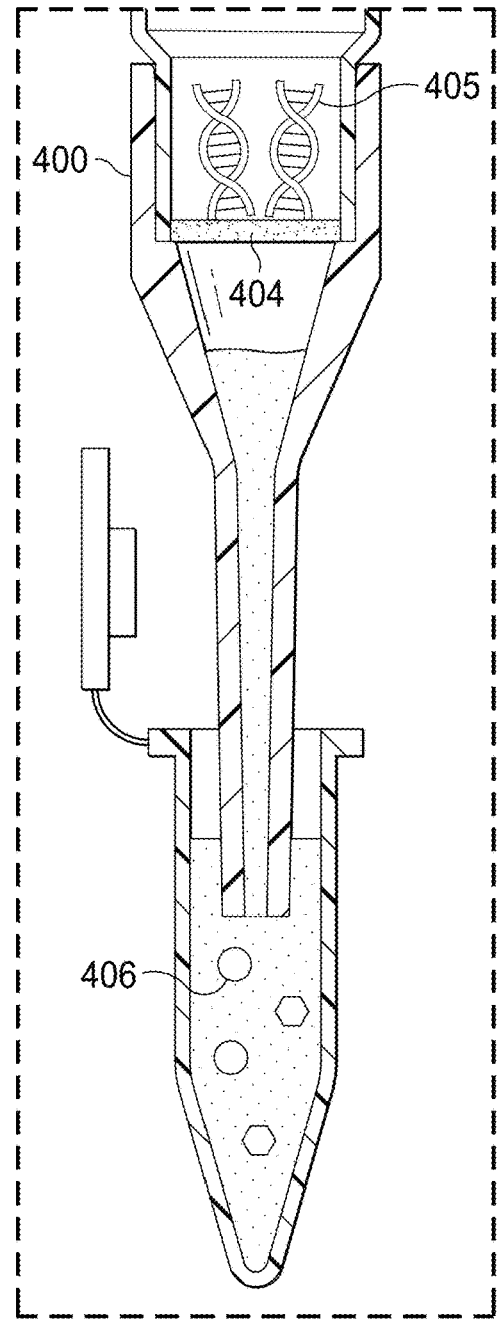

FIG. 4A-C display a membrane device 400 attached to a wide bore pipette tip 401 and used for extracting DNA or RNA or both from a sample 403, such as a whole blood sample. The membrane consists of silica fibrous material approximately 0.5 mm in thickness with 1 µm porosity. In use, the sample solution 403 is added to the top of the pipette tip (FIG. 4A) and pushed through the silica membrane device. This silica membrane device is able to extract DNA/RNA 405 from the sample solution (FIG. 4B) by binding it to the membrane 404 while the other components (shown as circles and hexagons) 406 flow through. A solvent such as a mixture of water and ethanol can then be used to wash the membrane, after which the membrane is allowed to dry. Once the silica is dry, an elution solvent 407 can be added to the upper portion of the membrane device and pushed through, eluting the DNA/RNA from the silica membrane into a sample well. Alternatively, a low volume of elution solvent can be aspirated into the membrane device through the membrane from the bottom, and then dispensed to elute the DNA/RNA. The fluid up/down aspiration/dispense cycle of low volume can be repeated to improve recoveries.

It was found that the extraction using the silica membrane device was unexpectedly fast while coupled to a vacuum block. The flow rate was about 2 mL/min, with about 1 mL of the sample passing through the silica membrane device in about 30 seconds. This extraction time was about 10 times faster than extraction methods using silica particles in a dispersive solid phase extraction tip. Further, the silica membrane had a much faster drying time compared to silica particles. As the drying of the silica is an important step to achieve high recoveries of DNA and RNA, this decrease in drying time leads to a quicker extraction without sacrificing recovery. Most importantly, it was found that using the silica-based membrane device required lower solvent volumes to obtain high recoveries compared to silica particles.

Figure 5B:
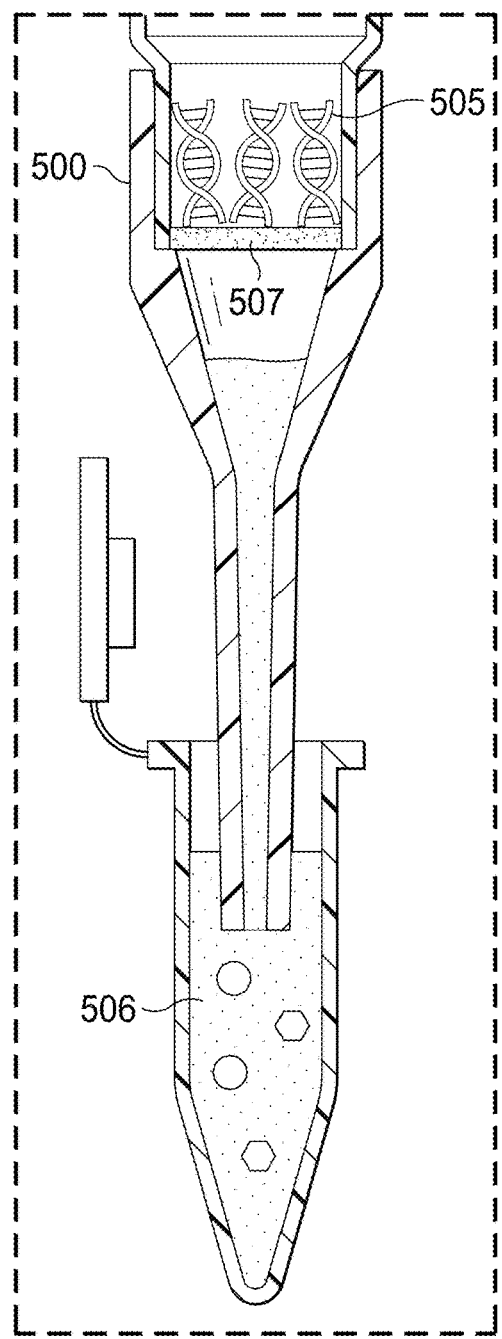
Figure 5C:
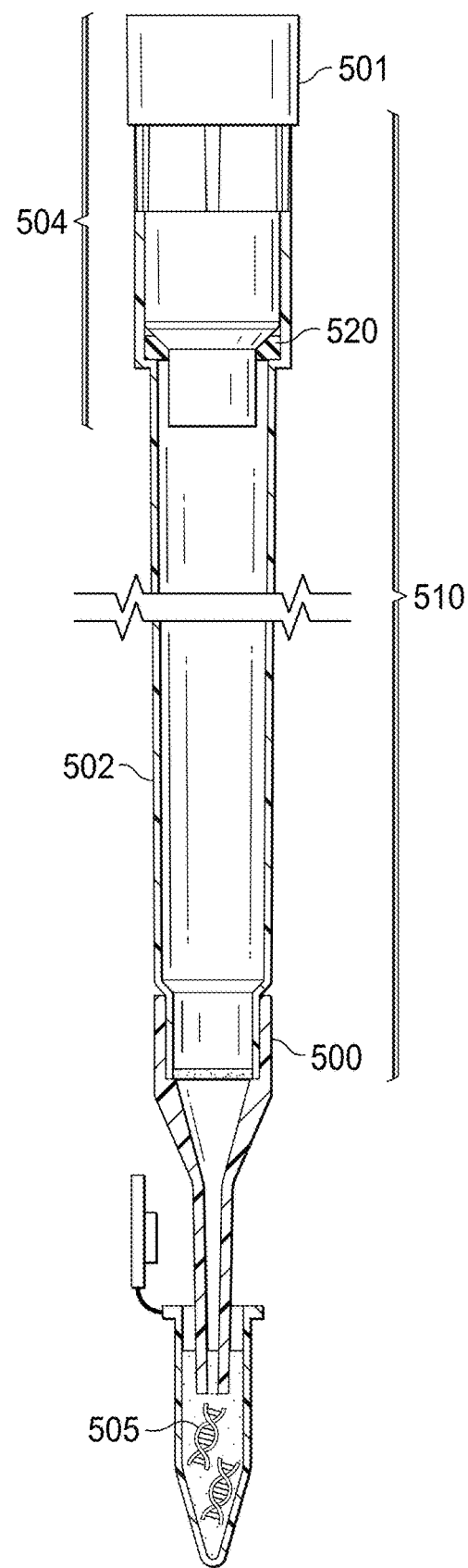

It should be noted that addition of sample to the top wide opening of the 1 mL tip may lead to contamination. To avoid cross-contamination, an adaptor can be used (after addition of the sample solution) so that the RLH can continue to process the extraction without coming in contact with the sample solution. FIG. 5A-C display the use of the silica-based membrane device 500 with the gasket adaptor-on-tip device 510 (made of 504 and 502 fitted together) used for automated extraction methods on a Hamilton robotic system (not shown). Briefly, after sample solution 503 is added to the wide proximal end of the 1 mL wide bore pipette tip with membrane device, the hub of the pipette tip is potentially contaminated with the sample. Hence, the RLH cannot access the tip directly to prevent cross-contamination. The adaptor-on-tip device 510 utilizes a 'top' adaptor 504 (with optional gasket 520) that irreversibly attaches to the 'bottom' wide bore pipette tip 502. Upper end 501 fits over separate device, such as RLH (not shown), in a fluid tight way, such as already described for the other devices. FIG. 5A shows the use of a gasket 520 to form an irreversible air tight seal between the gasket adaptor and bottom tip 502. The use of the adaptor-on-tip device 510 allows the RLH to access and move the tips without concerns of cross-contamination because the pipetting head does not contact the bottom tip 502. It is also possible that the adaptor can be designed without a gasket, such that the adaptor fits snugly into the top of the wide bore tip to make an irreversible seal.

In FIG. 5B, we see DNA 505 bound to the silica membrane, and waste material 506 such as cell debris washing through. After addition of solvents and drying the silica membrane, the membrane device (with attached adaptor on tip) can then be placed over a well plate, wherein low volumes (50 to 200 µL) of an elution solvent such as DI water or buffer can be aspirated and dispensed through the silica membrane multiple times (2 to 10 times) to remove the DNA 505 from the silica membrane 507, and in FIG. 5C the eluted DNA 505 is collected. The well plate with the elution solvent can be optionally heated to improve recoveries. The eluted sample can then be analyzed in a manner known in the art.

In some embodiments, the membrane device is attached to a reservoir adaptor that is accessible by the RLH, i.e. the proximal opening of the reservoir adaptor has the same dimensions as the hub of the pipette tip that fits onto a robotic liquid handler. This reservoir adaptor not only negates the need to use a syringe or attached wide bore pipette tip, but it also allows the RLH to pick up and move the membrane device via its reservoir adaptor around the RLH platform without affecting the RLH's movement accuracy. This allows for a fully automated process.

Figure 6:
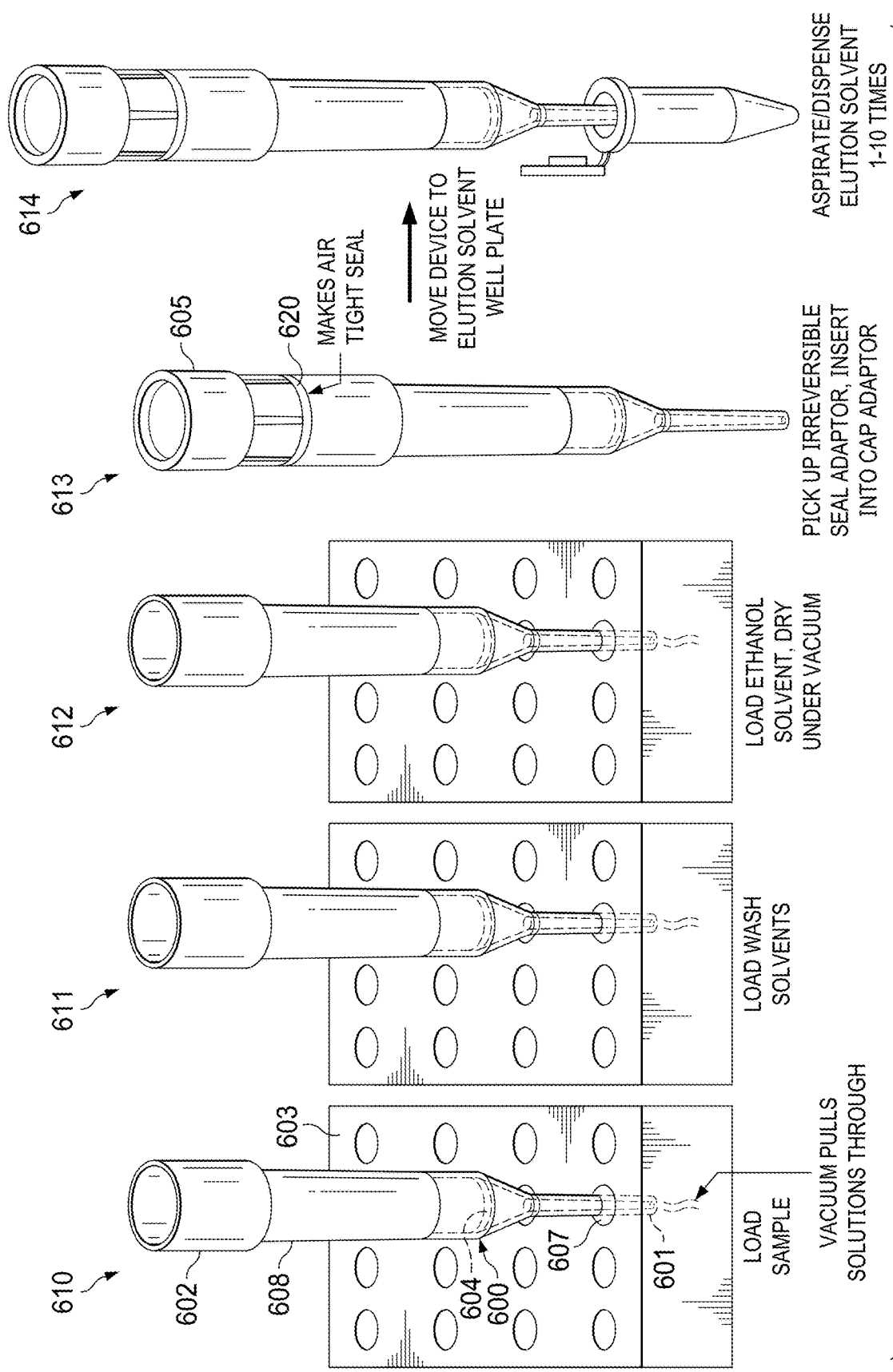
FIG. 6 displays one embodiment of a RLH method for using a membrane device for applications utilizing a vacuum block (block not drawn to scale).

FIG. 6 shows such an arrangement, wherein a reservoir adaptor 602 that can be accessed by a robotic liquid handler is attached to a membrane device 600 having a membrane 604 attached to a fluid delivery cylinder 608 therein and tip 601. Here, a vacuum block 603 (not drawn to scale) is used to pull solvents through the membrane device 600 and the reservoir adaptor 602. Only a single membrane device is shown in FIG. 6 for clarity, but in reality they may be arranged in an array to match a microtiter plate or the vacuum block 603 shown below the device 600.

The reservoir adaptor is approximately 2 cm in length. The upper wide opening end attaches directly to the pipette channels of the RLH. The bottom part of the reservoir adaptor fits into the top of the membrane device, preferably all the way down to the filter, so that the membrane is held in place. The reservoir adaptor has a volume inside that allows samples to be loaded on top. It may, for example, hold 200 to 300 µL of sample solution (or wash or elution solvents).

By placing the reservoir with membrane device onto a vacuum block (with holes to seal to the needle of the membrane device to the vacuum block), sample solutions can be loaded top down through the membrane device. It is noted that the use of vacuum block allows a milliliter or more of sample solution to be loaded with a much lower volume reservoir.

Vacuum blocks are notoriously difficult to incorporate into a fully automated process for filtrations or extractions for current commercially available products (such as filtration plates) because the analytes of interest are collected under a vacuum. When using a vacuum block, a filtration plate (of 96 samples) is placed onto the vacuum block, and the solution collection wells are thus placed under the vacuum block. The vacuum has to be broken, then the filtration/extraction plate has to be moved out of the way, then a collection plate has to be placed in the block, then the filtration/extraction plate returned. After elution, the same process has to be repeated, and then the collection plate is accessible for further analysis. This adds time to the filtration/extraction process, and oftentimes causes downtime when there is a slight misplacement during these automated movements.

The use of the reservoir adaptors with the vacuum system makes this automated process much faster and more robust.

Referring again to FIG. 6, membrane device 600 with the attached reservoir adaptor 602 has been placed on a vacuum block 603 by the RLH. An o-ring 607 may be attached to the vacuum block to facilitate drawing a vacuum, but also to allow for the vacuum seal to be broken more easily after the loading and elution process. It's also possible to use a gasket with small holes on the vacuum block to readily load and remove the membrane device from the vacuum, maintaining air tight seals.

In step 610, the sample solution can be loaded into the reservoir adaptor 602 directly while the vacuum is pulling the solution through the membrane 604 into a waste container (not seen). As long as the vacuum is pulling a faster flow of solution than the delivery of the sample solution from the robotic liquid handler, then large amounts of volumes can be delivered to the membrane device 600 in one step even if the reservoir 602 has only a small volume.

After loading the sample solution, wash solvents can be likewise delivered and pulled through the membrane 604 via vacuum flow in step 611. For extractions of DNA or RNA, where a drying step is needed, the membrane can be allowed to dry under vacuum, as shown in step 612. After washing the membrane, the vacuum can be electronically closed or shut off. Here, a gasket adaptor 605 that forms an irreversible seal via gasket 620 with the reservoir adaptor can be attached to the reservoir adaptor in step 613 and used to pick up the membrane device 600 and move the device to a well plate to elute the analytes of interest (for example, DNA or RNA) in Step 614. A benefit of the gasket adaptor 605 is that it eliminates sample contamination of the RLH pipettor head. Since sample solution does not come in contact with the hub of the gasket adaptor, the RLH pipettor head cannot become contaminated performing these extraction steps.

Another advantage of the reservoir adaptors to filtration plates is that the RLH can process one single membrane device up to 96 membrane devices simultaneously using a 96 robotic head. The single device up to 96 devices can be readily moved from the vacuum block to other well plates for elution (or even additional wash steps). This is beneficial when developing extraction and filtration methods as this will allow for the selection of just one tip for testing, without requiring loading of all 96 membrane devices with a filtration plate. It also allows for random access, if desired, which may be useful in method development research and development.

Figure 7:
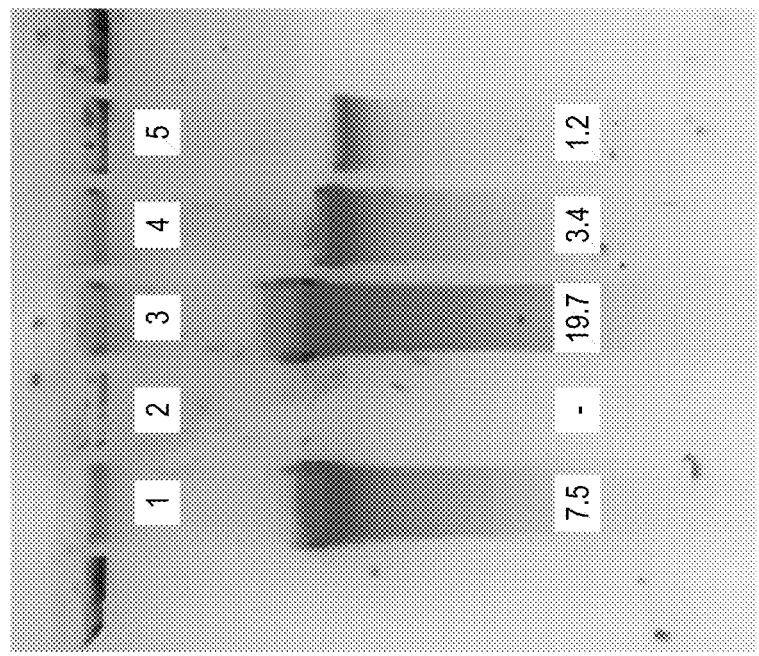
FIG. 7 displays a picture of an agarose gel of a DNA sample using the DNA extraction method with (1) 20 μL of commercially available MagBeads; (2) flow through with the presently described membrane device equipped with a silica membrane; (3) elution 1 with 100 μL buffer through the presently described silica membrane device, (4) Elution 2 with a second 100 μL buffer through the presently described silica membrane device, and (5) Elution 3 with a third 100 μL buffer through the presently described silica membrane device.

FIG. 7 displays a picture of an agarose gel of DNA extracted using the adaptor on tip setup shown in FIGS. 5A-C and the above method. High recoveries of about 19.7 μg are shown for the first elution through the silica membrane device (lane 3). Subsequent elutions resulted in an additional 3.4 (lane 4) and 1.2 μg (lane 5). In contrast, the use of commercially available magnetic beads for DNA extraction resulted in the recovery of only 7.5 μg of DNA after one elution (Lane 1). Lane 2 is referred to as the "flow through" or breakthrough solution, which is the solution of the sample that is collected after passing through the silica membrane device. In Lane 2 there is no detectable amount of DNA, indicating that all of the DNA in the sample solution was bound to the silica membrane, confirming correct functionality of the device.

Figure 8:
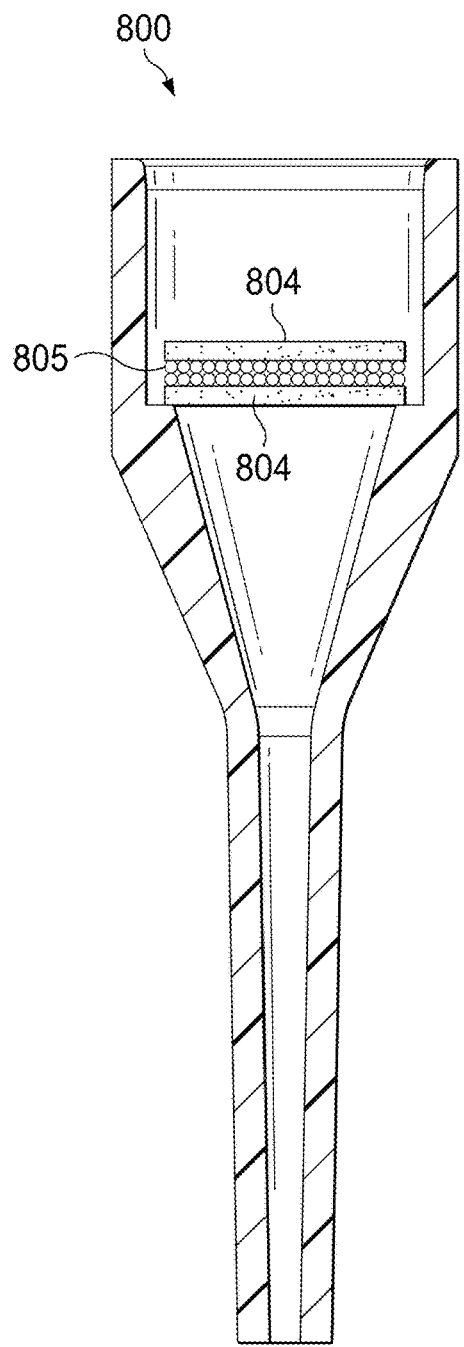
FIG. 8 displays extraction media positioned between 2 membranes contained in the membrane device.

In addition to directly using the membrane in the device to perform extractions (e.g., silica binding to DNA), it is also possible to perform solid phase extraction (SPE) using conventional sorbent material 805 sandwiched between two or more layers of filtration membranes 804 in the membrane device 800, as shown in FIG. 8. The SPE packing can be held in place by having the membrane device attached to a syringe or end of a wide bore pipette tip. Alternatively, a ribbed support (e.g., annular disk with a cross bar or two) can be added on top of the membrane closest to the syringe or a wide bore pipette tip, as discussed above. Any sorbent typically used in SPE can be incorporated between the membranes 804, including but not limited to, strong cation exchange, weak cation exchange, strong anion exchange, weak anion exchange, reverse phase, polar, nonpolar, silica, C18, or combinations thereof.

Figure 9A:
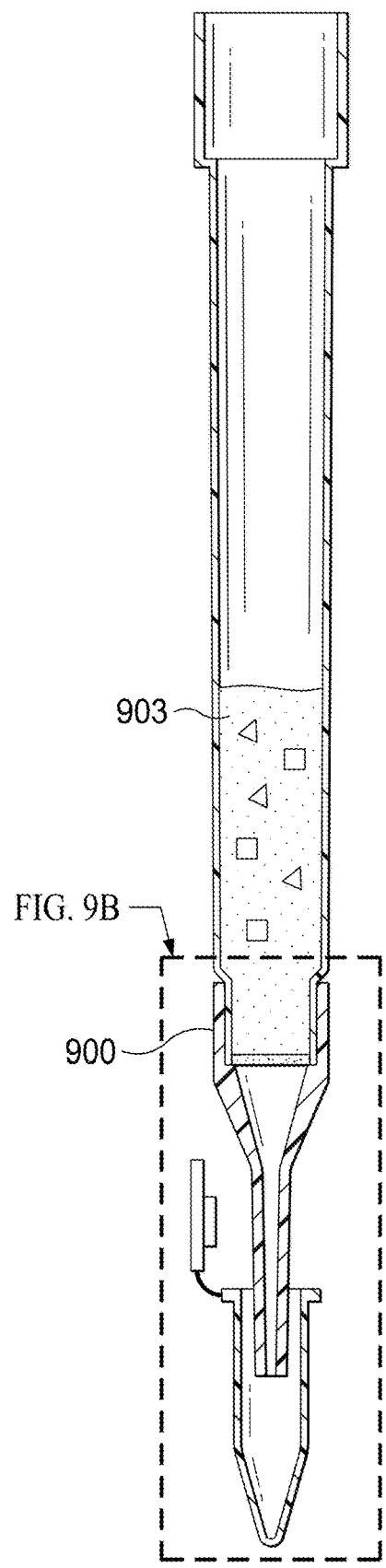

The membrane device can also be used for filtration as shown in FIG. 9. The solution 903 with particulate matter (shown as triangles and squares) 902 can be aspirated into a syringe or pipette tip, and then be attached to a membrane device 900, wherein the solution is then dispensed into the membrane device. The particulate matter is filtered by the membrane while the remaining solution 905 passes through to a collection receptacle. The porosity of the membrane(s) can be controlled to allow for selective filtration.

In FIG. 10, a membrane device 1000 with a stack of three membranes with varying porosities for efficient filtration is shown. The top (closest to the opening of the upper portion) membrane 1001 has the largest pore sizes to filter and remove large particulate matter, the second membrane 1002 has smaller pores to further remove particulate matter. The third membrane 1003, which abuts the ridge or ridge support, has the smallest pores, allowing for filtration of submicron particulates. By stacking these membranes in decreasing order of pore size, ultrafiltration of the sample solution to remove particulate matter that is 0.5 μm or larger can be performed without the need of high pressures.

FIG. 11A-D depict an exemplary use of the presently described membrane device for immunoassays. A wide bore pipette tip 1102 is shown here with the membrane device 1100, however a syringe can also be used. The membrane device uses a membrane with immobilized proteins 1104 that can bind free labeled monoclonal antibodies.

Figure 11C:
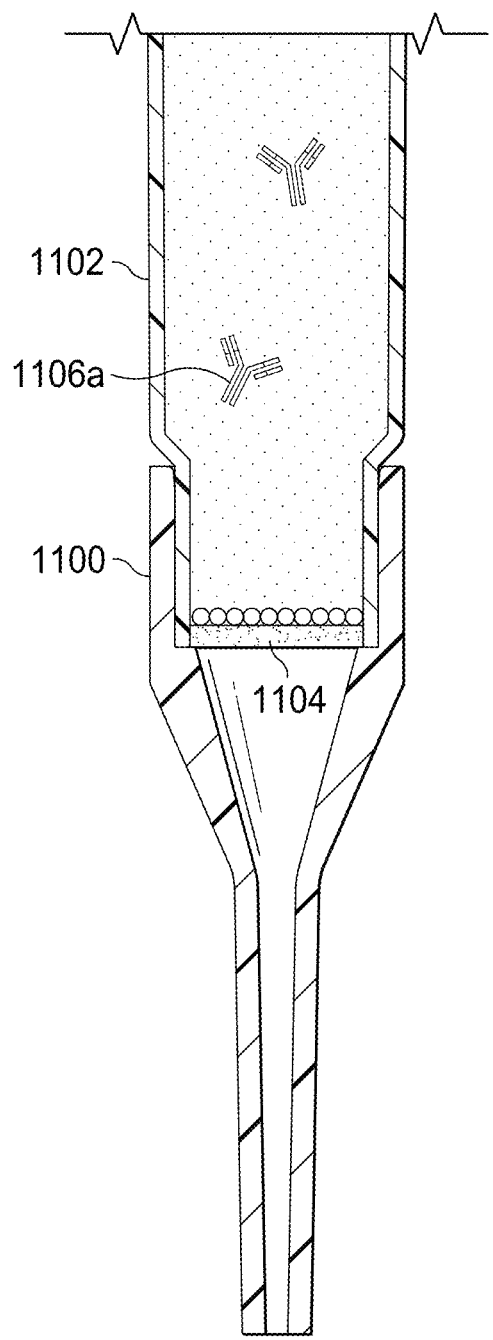
Figure 11D:
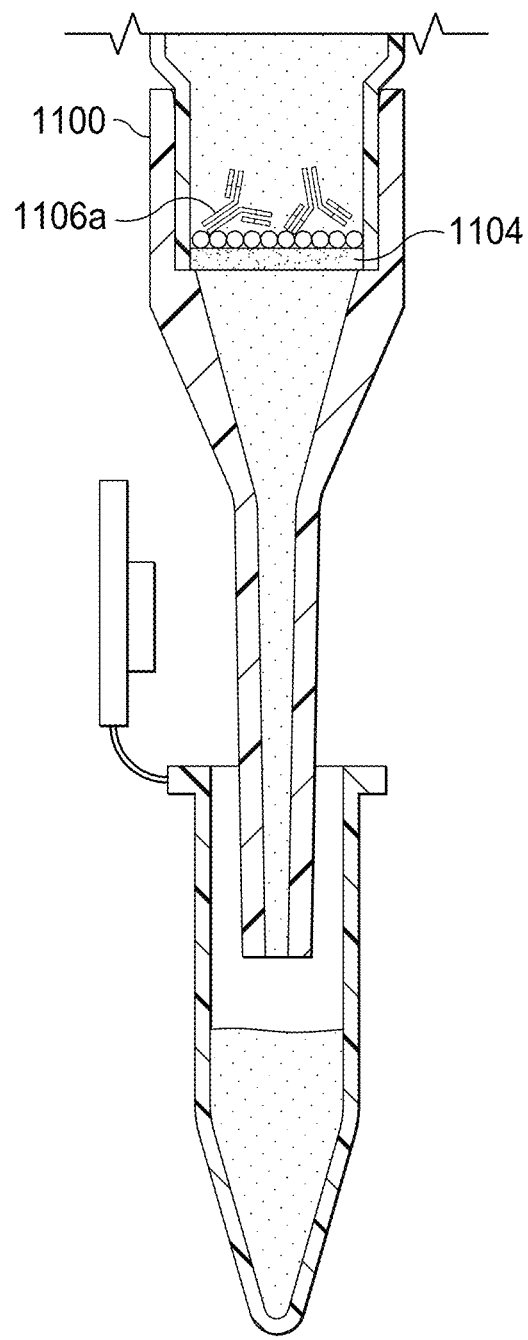

The sample solution in FIG. 11A-D have been premixed with labeled monoclonal antibodies (not shown). In FIG. 11A, the sample solution contains proteins 1103*b* that are capable of binding the antibodies, and are shown in FIG. 11A as being bound to the labeled monoclonal antibodies 1103*a*. This prevents the labeled monoclonal antibodies 1103*a* from binding with the immobilized proteins 1104 on the membrane, resulting in their ability to freely flow through the membrane into the collection well, as shown in FIG. 11B. In contrast, FIGS. 11C-D depict a sample solution without the target proteins which allows the antibodies 1106*a* to bind to the immobilized proteins 1104 on the membrane.

As another example of an immunoassay application, it is possible to design the membrane device for screening of SARS-Cov2—the causative agent for COVID-19. The membrane(s) in the membrane device can have immobilized spike protein in excess compared to the antibody solution. A sample solution consisting of buffer solution from nasopharyngeal or oral fluid swabs, or saliva (from spit samples) can then be mixed with a solution of labeled anti-SARS-Cov2 antibodies, which can have a deep color, or be fluorescent, or have an attached enzyme (like horse radish peroxidase) or some enzymatic substrate. After mixing the solution, the solution can be manually aspirated into a syringe, which can then be attached to a membrane device with the protein spiked membrane. The solution can be passed through the membrane by pressing the plunger of the syringe, wherein the solution can be collected in a receptacle. If the collected solution has "color" or is "fluorescent" or causes a color change through an enzymatic reaction (e.g., the collection vial has an enzyme or enzyme substrate present), the sample solution would be positive for containing a spike protein and would represent a presumptive positive for COVID-19. This result will instantly let the subject know to quarantine and request a confirmatory RNA test for the virus.

It should be noted, in this same example, it is possible to capture and concentrate the labeled antibodies with attached proteins that have passed through the membrane (as in FIG. 11B). As an example, if the antibodies are from a mouse, another antibody membrane or disc could bind the labeled antibodies using anti-mouse antibodies. This would allow for the labeled antibodies to be concentrated in a low volume of about 20 μL. If the original sample volume was 1 mL, the resulting analysis would be made of the 20 μL, giving an increase in sensitivity of 50-fold.

Alternatively, using the same example, it is possible for a rapid analysis to be done using the spike protein membrane device in a high throughput laboratory with a robotic liquid handler with a 96 channel pipettor. In this example, the sample solutions could be mixed in a 96 well plate with the labeled antibodies (total of 96 samples). Then the 96 samples could be aspirated by the 96 channel pipettor before being dispensed/passed through the membrane devices (one sample/channel per membrane device) and collected using adaptor on tip technology into a 96 well plate, or a 384 well plate (performing the method for a total of 4 times). A plate reader could then detect color or fluorescence using a conventional plate reader, and determine positive and negative subject results in a matter of seconds. Positive test results could be confirmed with RNA testing, and therefore the laboratory could reduce the number of RNA testing to reduce costs and greatly improve turnaround time.

Figure 12A:
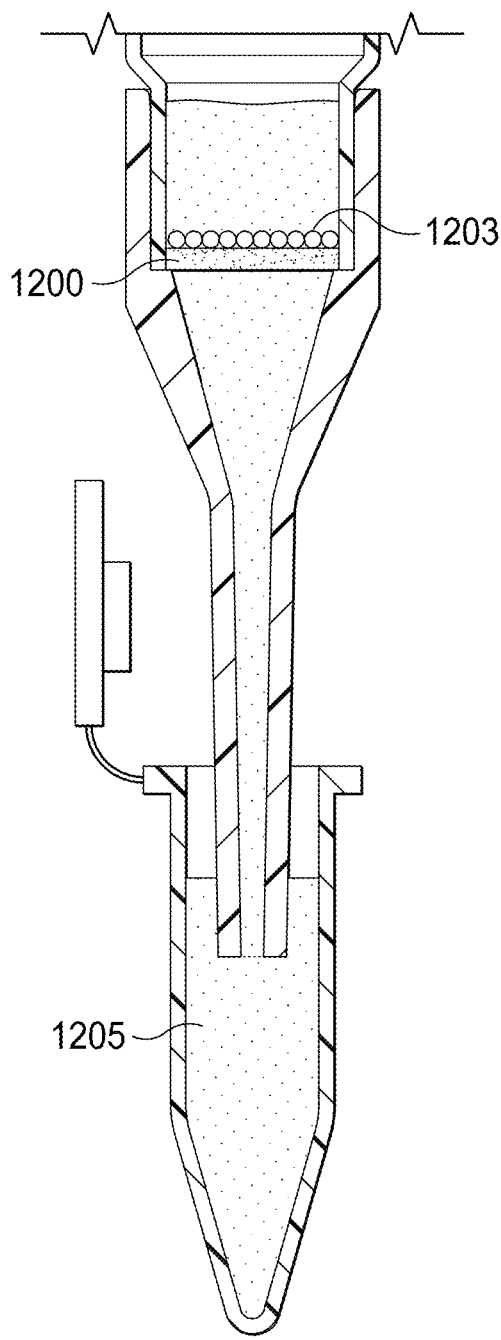
FIG. 12 shows the capture of nuclei (FIG. 12A) as a means to improve DNA isolation. Once the non-nuclear components travel through the filter, the nuclei are lysed (FIG. 12B) to allow the DNA to pass through to the collection vial.

For isolation of nuclei from whole blood and tissue samples, for example, the sample solution can be first treated with a buffer solution (such as 50 mM Tris-HCL, pH 7.4, 1% Triton X100) that lyses cell membranes while keeping the nuclei intact. The solution is then passed through a filtration membrane 1200 that captures the nuclei 1203 as seen in FIG. 12A. The solution that passes through the filtration membrane, which we refer to as the breakthrough solution 1205, will contain proteins, RNA, phospholipids, salts and various small molecules. This solution could also contain cell free DNA and cytosolic nucleic acids, which could be collected and isolated using silica membrane technology mentioned above.

Figure 12B:
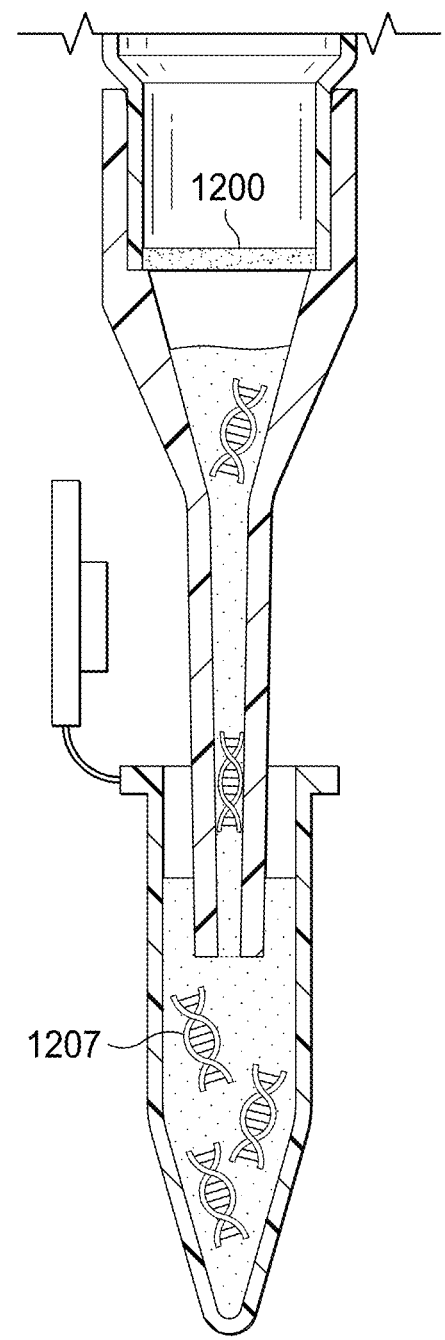

After passing the sample solution through the membrane, the nuclei would be trapped in, or on top of, the pores of the membrane. An optional wash step could be incorporated to remove all traces of the sample debris, and then another solution (such as 50 mM Tris-HCL, pH 7.4, 0.5% SDS) is passed through the membrane 1200 to lyse the nuclei. The solution that passes through this membrane (FIG. 12B) will contain the DNA 1207 of interest. If the buffer chosen for lysing the nuclei is compatible with PCR (such as 10 mM Tris-HCL, pH 7.4, 150 mM NaCl2, 0.1% Igepal CA-630), then this solution is ready immediately for PCR amplification and DNA analysis without further purification. This 2-step process is clearly depicted in FIG. 12.

Figure 13:
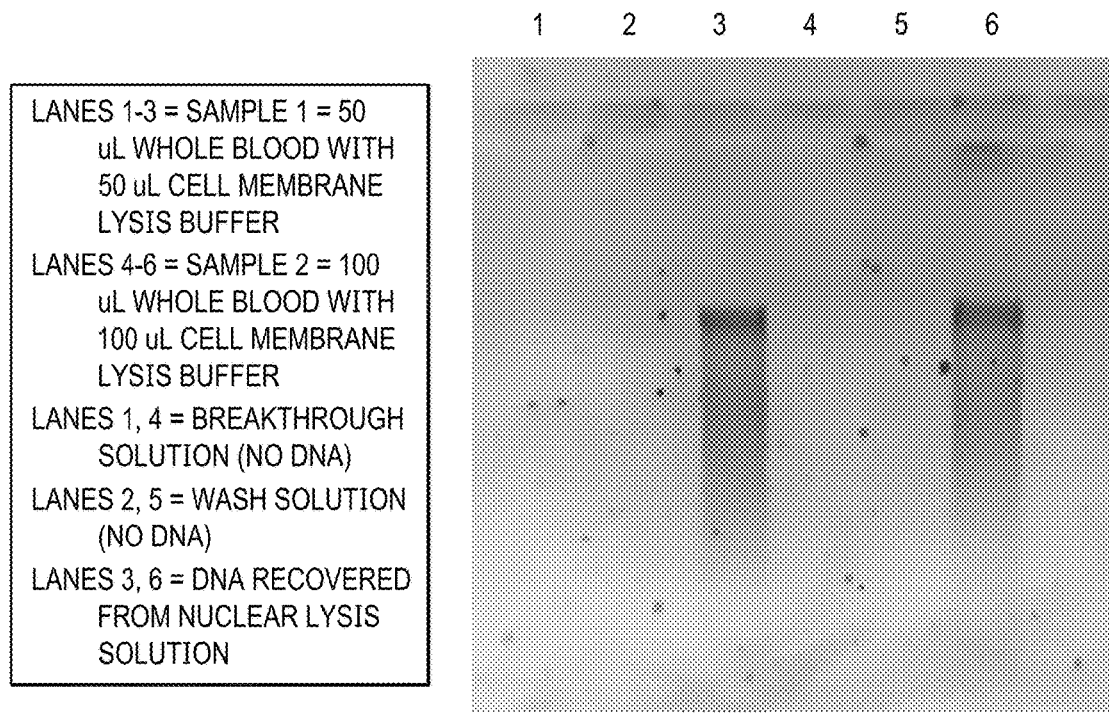
FIG. 13. Agarose gel electrophoresis of DNA recovered from whole blood lysed sample solutions passed through 3 μm porous silica fiber filtration membranes. Sample 1 was 50 μL whole blood with 50 μL cell membrane lysis buffer (lanes 1-3), Sample 2 was 100 μL whole blood with 100 μL cell membrane lysis buffer (lanes 4-6). Lanes 1, 2, 4 and 5 show no DNA recovered from the breakthrough and wash solutions of samples 1 and 2, respectively. Lanes 3 and 6 show DNA recovered from the nuclear lysis solution of samples 1 and 2, respectively.

Agarose gels of lysed whole blood solutions that were processed using a silica membrane with a 3 µm porosity are shown in FIG. 13. This membrane device was attached to a 1 mL Hamilton wide bore pipette tip. About 50-100 µL of whole blood was lysed with 50-100 µL of cell membrane lysis buffer, and the solution was passed through the 1 mL pipette tip through the attached membrane device. After collecting the breakthrough solution (and saving it for further DNA purification), 0.2 mL of nuclei lysis buffer was added to the 1 mL Hamilton pipette tip and passed through the attached membrane device. This solution was collected and labeled as nuclei lysate.

Both the collected breakthrough and nuclei lysate were extracted for DNA using conventional and commercial bead technology. The commercial beads bind DNA and are washed and eluted with commercial buffers and solvents through the use of a centrifuge.

Lanes 1 and 4 show no DNA was recovered in the breakthrough for 2 separate sample solutions, 50-100 µL, respectively, and Lanes 2 and 5 show no DNA in the wash buffer for the corresponding 2 sample solutions. Lanes 3 and 6 show DNA recovered from the nuclei lysate solutions.

It could be argued that the use of silica fibers creates a similar "binding" mechanism as described in U.S. Pat. No. 8,202,693 since silica can have a negative charge. We found that if the nuclei isolation buffer is allowed to mix with the silica fiber, but not forced to pass through and become trapped in the pores, negligible DNA is extracted. The vast majority of DNA is in the breakthrough solution. This suggests that the silica does not bind the nuclei, but that the pores for trapping the nuclei by size are necessary for the analysis.

The above experiment was unsuccessful when trying to use a larger volume of blood, such as 150 µL, because the pores became clogged with the increased number of intact nuclei. However, by doubling the diameter of the 0.333 cm filter, we were able to successfully extract 200 µL of whole blood.

Figure 14A:
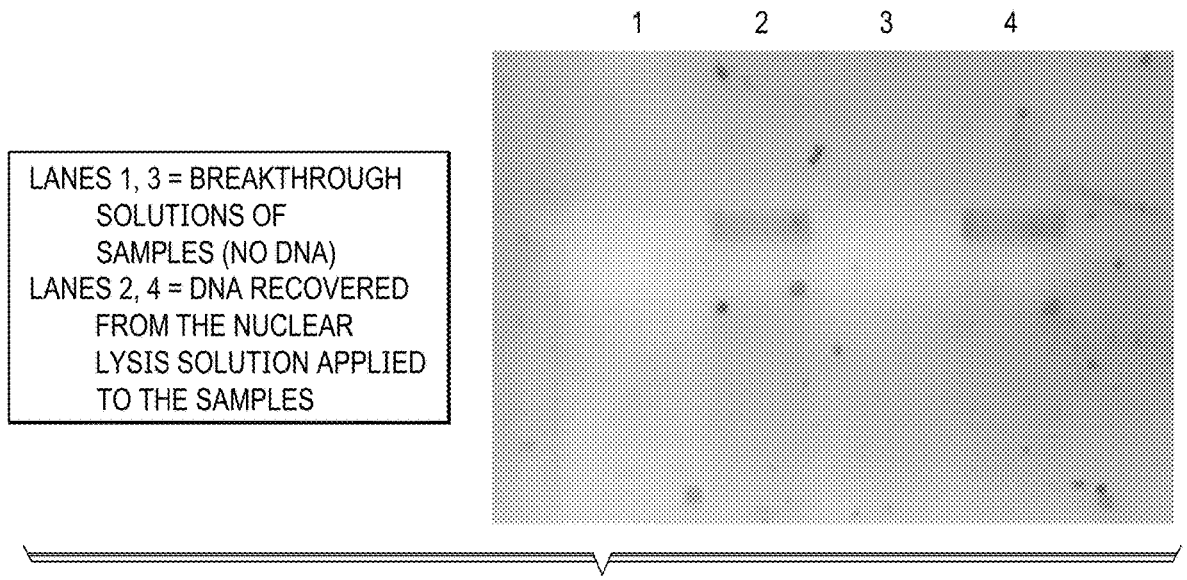
FIG. 14A. Agarose gel electrophoresis of DNA recovered from nuclei trapped by a 1 μm polypropylene depth filter membranes in the membrane device with the attached reservoir adaptor. Both samples were 100 μL whole blood with 100 μL cell membrane lysis buffer which lysed cells but left nuclei intact. Lanes 1 and 3 show no DNA recovered from the breakthrough solutions of the samples, and lanes 2 and 4 show DNA recovered when the nuclear lysis solution was applied to membrane device and DNA eluted therefrom.

We performed a similar study with a polypropylene depth filter attached to a membrane cap (instead of a 1 mL pipette tip). This material lacks any charge and therefore has no ionic interaction. The depth filter was 1 µm in porosity, and the flow of lysed whole blood (0.05 mL with 0.05 mL buffer) was faster than with the silica fiber. FIG. 14A is a picture of agarose gels of the breakthrough and nuclear lysates. DNA was only found in lanes 2 and 4 indicating that the nuclei were trapped in the membrane device and then released by the lysis solution. Tests with DNA confirmed that DNA did not bind to the filters per se, but that the membrane device physically trapped the nuclei in the pores.

Another design of the membrane device incorporates a larger diameter to allow for up to 0.25 mL of whole blood (0.5 mL of total solution with lysate buffer) to be processed. In order to use with high throughput robotics and 96 (or 384) well plates, the diameter of the membrane device can be as high as about 7 mm. Obviously, a much larger diameter filtration medium could be designed, but larger sizes will not allow for 96 well plate format with high throughput robotics, although they could be used for 12, 24 or 48 well formats depending on size. In addition, a hand-held syringe or wide bore pipette tip could be used in a manual method.

In our examples, we used a DNA purification step with gel electrophoresis to demonstrate the capture of nuclei and the subsequent isolation of DNA. However, once the nuclei are lysed with non-inhibitory PCR lysate buffer, the method of analysis would be very rapid and unsurpassed in the industry. A small aliquot of the lysate would be provided for PCR amplification without any further sample processing. A total of 96 whole blood samples (already transferred to a 96 well plate) could be processed simultaneously with 96 membrane devices, and after a 2-step process of nucleated cell trapping followed by lysing the nucleated cells, the samples would be ready for PCR amplification in under 2 minutes. This device and methodology could revolutionize nucleic acid detection in general.

Figure 14B:
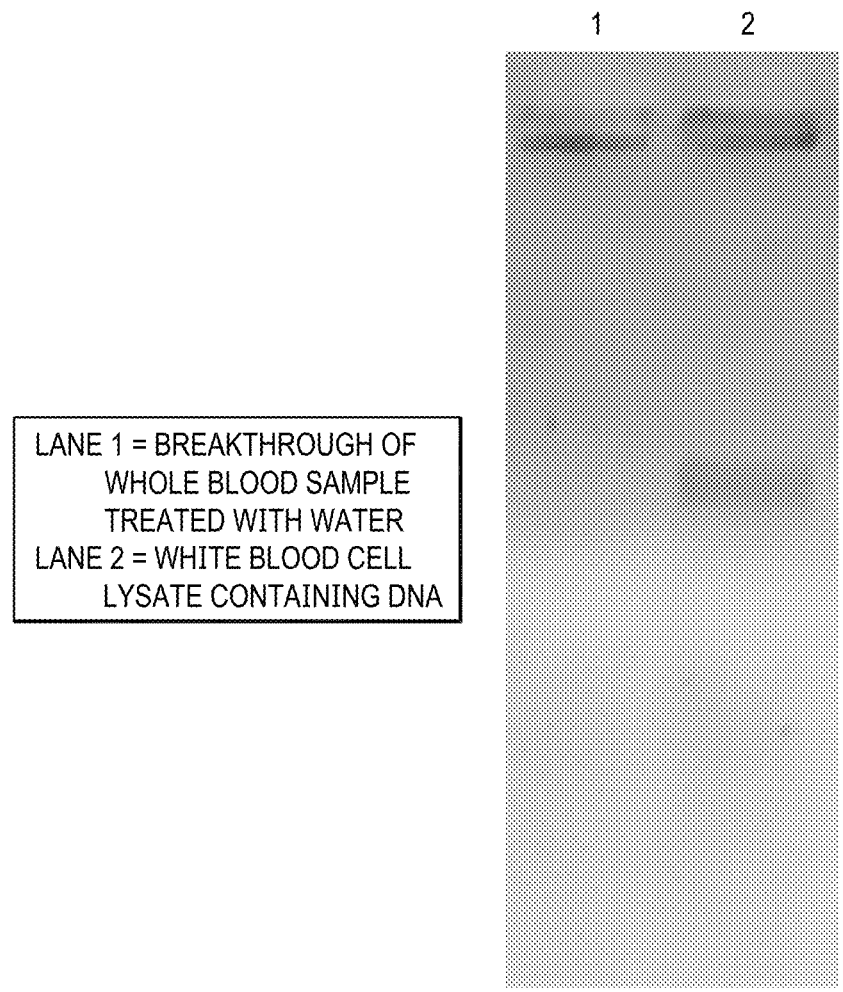
FIG. 14B An agarose gel of a sample treated with water to swell and trap whole white blood cells, where lane 1 is from the breakthrough solution, and lane 2 is from the white cell lysate.

The trapping of nuclei using the steps delineated above have sometimes been challenging. A much improved method for isolating DNA from the nuclear cells in whole blood is to use water to lyse the red blood cells, and allow the white blood cells to swell and stay intact. In this manner, whole white blood cells are filtered and "trapped", and the trapped cells are subsequently lysed and analyzed for DNA. The same method as shown in FIG. 12 would apply, except that white blood cells with their nuclei are being captured and later lysed and analyzed. FIG. 14B shows an agarose gel of a sample treated with water to trap the white blood cells. Lane 1 shows the breakthrough of whole blood treated with water (50 µL whole blood mixed with 450 µL water), and no DNA is detected. Lane 2 shows the presence of DNA after treating the filtered sample with cell and nuclear lysate buffer for white blood cells.

Figure 15:
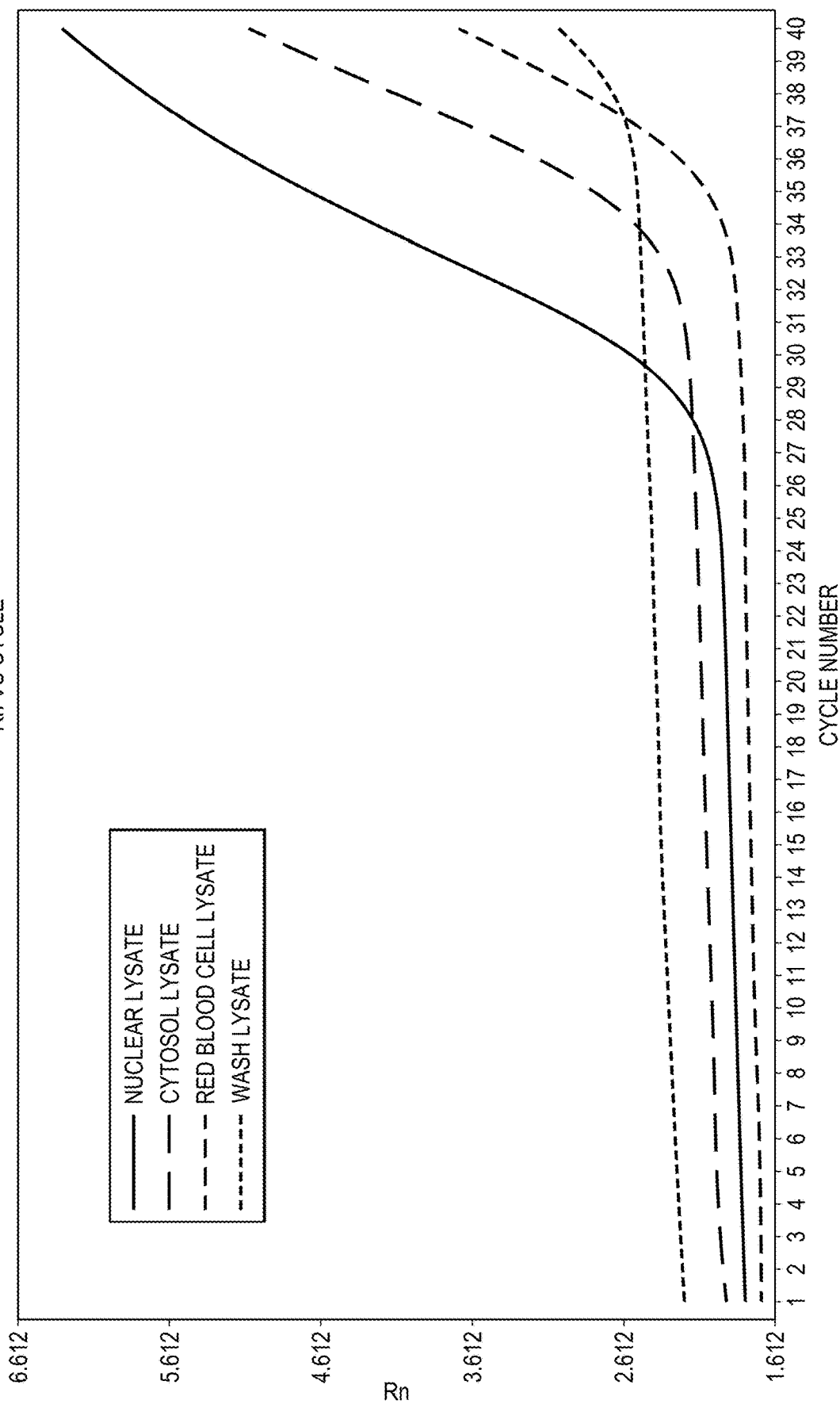
FIG. 15 shows PCR amplification of lysates processed with the membrane device.

FIG. 15 shows PCR results for the analysis of cell lysates using the membrane device. Fifty microliters of whole blood were added to our red blood cell lysis buffer and applied to the membrane device and the breakthrough was collected (red blood cell lysate). Wash buffer was added to the membrane device and the breakthrough was collected (wash buffer). Cytosol lysis buffer was added to the membrane device and the breakthrough was collected (cytosol lysate). Nuclear lysis buffer was added to the membrane device and the breakthrough was collected (nuclear lysate). The red blood cell lysate and wash buffer breakthroughs were centrifuged to recover any intact cells that may have gotten through the membrane device and resuspended in the nuclear lysis buffer. The relative amounts of DNA present in each lysate were determined by real time PCR amplification of the ribonuclease P H1 gene (RPPH1). One microliter of each lysate was amplified in a 20 μL reaction and the amplification plots are shown in FIG. 15.

Figure 16C:
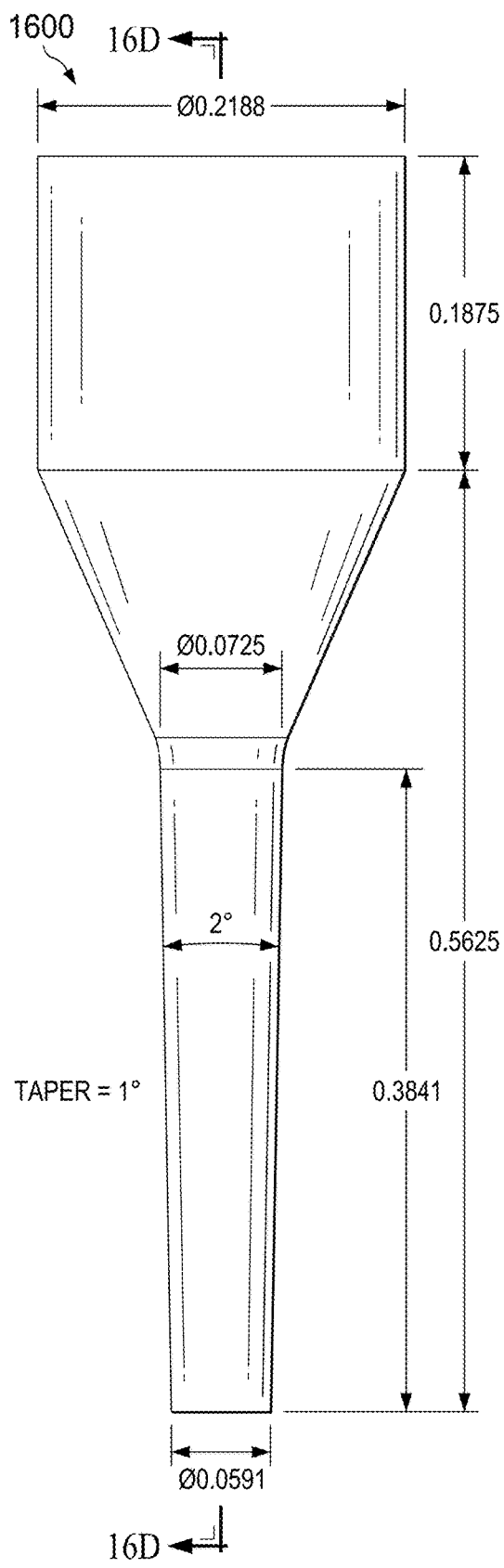
FIG. 16 provides another example of the membrane device in several views, including a perspective view at FIG. 16A, a top down view of FIG. 16B, a side view at FIG. 16C and a cross section through line D-D at FIG. 16D.
Figure 16D:
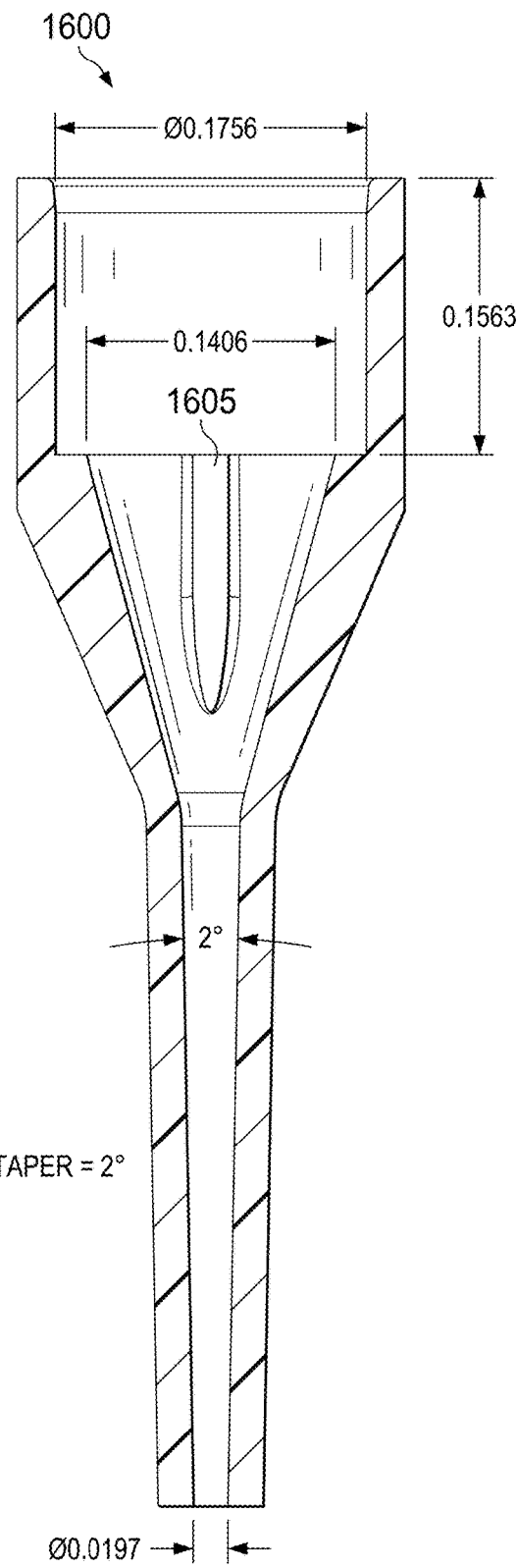

Additional views of a membrane device 1600 are shown in FIG. 16. Parts that are the same throughout are not labelled herein, but sizes are given as one example of exemplary dimensions specifically used for the Hamilton 1 mL wide bore pipette tip. Details that are added include a slightly flared opening above diameter 1601 inside the top tubular portion of the device 1600 (see also 16D), which functions to assist in entry and provide an air tight fit. Also see the 1° taper and 2° at the top tubular portion and bottom tubular portion respectively. Also added are 3 support structures or protrusions 1605 that serve to provide additional support to the filter. See also FIG. 3A for similar structures 301a.

Figure 17A:
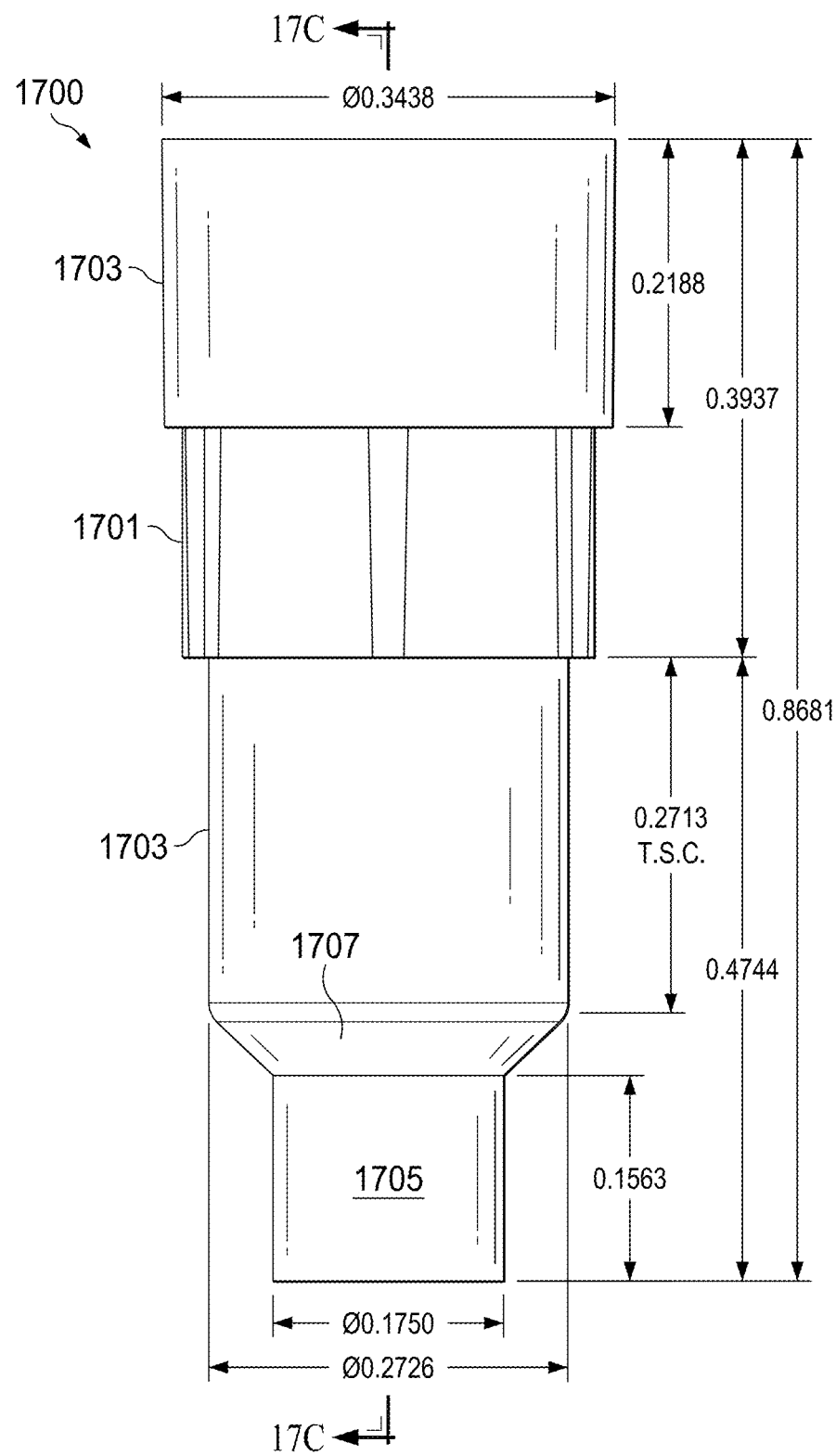
FIG. 17 shows several views of another example of a reservoir adaptor, including a side view at FIG. 17A, top view at FIG. 17B, cross view in FIG. 17C at line C-C.
Figure 17B:
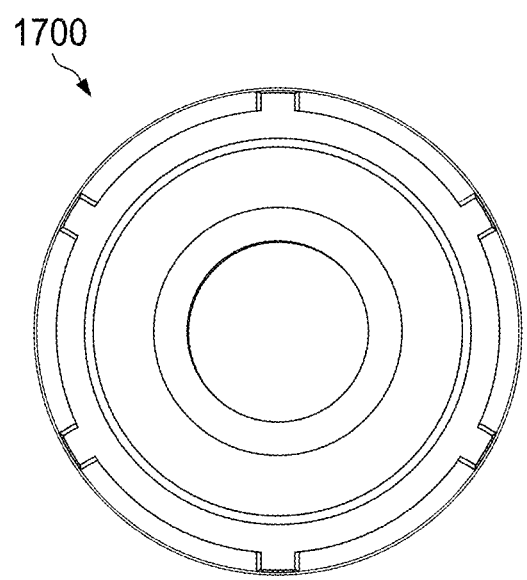
Figure 17C:
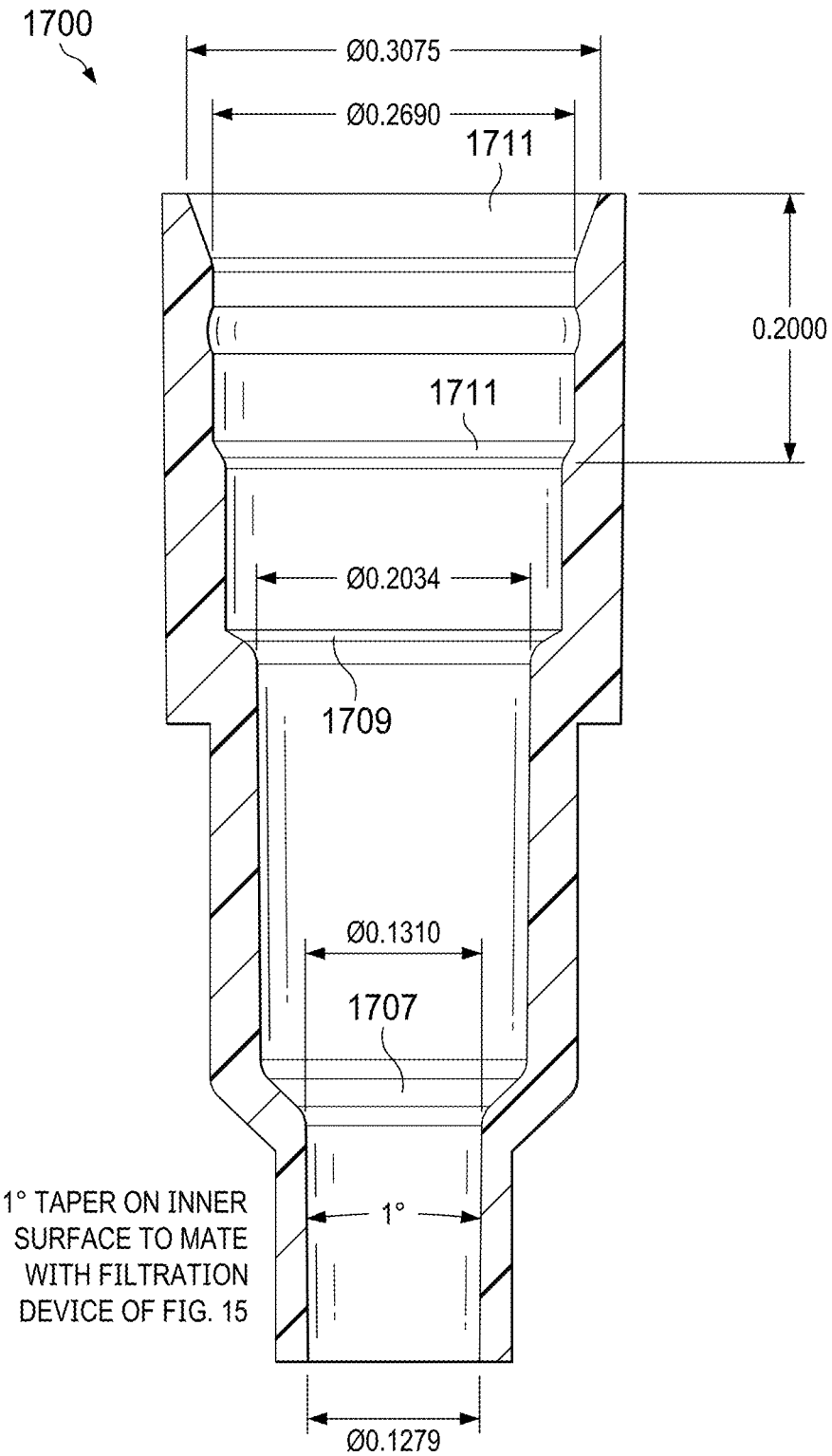

FIG. 17 shows another example of a reservoir adaptor 1700 with top portion 1703 sized like a 1 mL wide bore pipette tip (to fit a HAMILTON RLH), which have similar dimensions except length, and having ridges 1701 to provide strength and facilitate handling, slightly smaller middle portion 1703 and bottom portion 1705. Each region is bounded by small tapered areas, which serve to facilitate fluid flow, 1707, 1709 and 1711. Flared entry region 1711 also facilitates entry of other devices such as the RLH.

The following references are incorporated by reference in their entirety for all purposes.
WO2018026886
U.S. Pat. No. 8,202,693

The invention claimed is:

1. A membrane device, said device comprising:
    a) an upper portion having an open ended tubular shape with 0-2° taper and an internal diameter that is wide enough to fit over a separate device with a fluid tight fit, said separate device selected from a wide bore pipette tip, a slip tip syringe or a robotic liquid handler (RLH) adaptor;
    b) a lower portion below said upper portion, said lower portion being an open ended tubular shape with 0-3° taper;
    c) an intermediate portion having 45-180° of taper between said upper portion and said lower portion;
    d) said upper, intermediate and lower portions being in fluidic connection;
    e) a ridge on an inner surface between said upper portion and said intermediate portion;
    f) at least one circular filtration membrane located on top of said ridge;
    g) an optional removable reservoir adaptor that is an open ended tubular element having a distal end configured to fit inside said upper portion and provide a fluid tight fit therewith and an upper end configured to fit over said separate device in a fluid tight fit; and
    h) an optional removable gasket adaptor that is an open ended tube having a gasket coating on a bottommost outer surface and sized to fit inside said optional removable reservoir adaptor and provide a fluid tight interface therewith and an upper end configured to fit over said separate device.

2. The device of claim 1, wherein said upper portion has a 1° taper and said lower portion has a 2° taper.

3. The device of claim 1, wherein said upper portion has a 1° taper and said lower portion has a 2° taper and having said reservoir adaptor, said reservoir adaptor having a 1° taper at a lower end thereof.

4. The device of claim 1, having said gasket adaptor, a bottommost edge of said gasket adaptor having an elastomeric coating.

5. The device of claim 1, wherein said ridge is annular and has one or more support ribs protruding internally from said ridge for further supporting said at least one filtration membrane.

6. The device of claim 1, further comprising a locking washer in the shape of an annular disk located above said at least one filtration membrane for holding said at least one filtration membrane in place.

7. The device of claim 1, said device having a plurality of circular filtration membranes located on top of said ridge.

8. The device of claim 1, said device having two circular filtration membranes and a separation resin therebetween.

9. The device of claim 1, wherein said at least one filtration membrane comprises silica, nylon, cellulose, nitrocellulose, polypropylene, polyethylene, polytetrafluoroethylene, polyvinylidenefluoride, ceramics, metal, immobilized streptavidin, immobilized biotin, immobilized protein A, immobilized protein G, or combinations thereof.

10. The device of claim 1, wherein said device has a total length of about 2 cm, wherein said upper tubular portion has an internal diameter of 6-7 mm and a length of about 5 mm; wherein said lower tubular portion is about 1.5 to 2 cm, and the outer diameter of the lower tubular portion is 0.1-2 mm.

11. The device of claim 1, wherein said device has a total length of about 2 cm, wherein said upper tubular portion has an internal diameter of 4-5 mm and a length of about 5 mm; wherein said lower tubular portion is about 1.5 cm in length and is 1.6 mm or less in outer diameter.

12. A kit comprising a container holding a plurality of membrane devices of claim 1 plus a plurality of wide bore pipette tips or slip fit syringes or reservoir adaptors or gasket adaptors that fit said membrane device.

13. A kit comprising a container holding a plurality of membrane devices of claim 1 plus a plurality of reservoir adaptors that fit said membrane device and a plurality of gasket adaptors that fit said reservoir adaptors or pipette tips.

14. A method for treating a chemical or biological sample, comprising:
    a) dispensing a chemical or biological sample into the membrane device of claim 1 using said separate device;
    b) trapping a first portion of said sample in or on said at least one circular filtration membrane;
    c) passing a remaining portion of said sample out of said membrane device.

15. The method of claim 14, comprising a further step of eluting said first portion of said sample from said at least one circular filtration membrane after trapping step b).

16. The method of claim 14, said at least one circular filtration membrane being at least two membranes with a separation resin therebetween.

17. The method of claim 14, further including one or more washing steps comprising passing a wash solution through said membrane device.

18. The method of claim 14, said at least one circular filtration membrane being a plurality of membranes with decreasing pore size from a top membrane to a bottom membrane.

19. A method for extracting nucleic acids from a sample, comprising:
   a) dispensing a sample containing nucleic acid into the membrane device of claim 1;
   b) trapping said nucleic acid in or on said at least one circular filtration membrane, said at least one circular filtration membrane comprising silica;
   c) passing a remaining portion of said sample out of said membrane device;
   d) passing an ethanol solution through said device;
   e) drying said filtration membrane;
   f) passing at least one elution buffer for unbinding the nucleic acids from said silica through said membrane device; and
   g) collecting said elution buffer and nucleic acids into a separate sample collection vial.

20. The method of claim 19, further including a PCR amplification step to amplify said nucleic acid and a detection step to detect said amplified nucleic acid.

21. A method of isolating DNA from a cell sample, said method comprising the steps of:
   a) dispensing a sample containing cells into the membrane device of claim 1;
   b) passing a lysis buffer through said membrane device to lyse cells and release nuclei and cell debris;
   c) trapping said nuclei in or on said at least one circular filtration membrane, said membrane having a pore size of 0.4 to 5 microns;
   d) passing a nuclear lysis buffer through said membrane device to lyse said nuclei and release DNA; and
   e) collecting said nuclear lysis buffer and said DNA into a separate sample collection vial.

22. The method of claim 21, further including a PCR amplification step to amplify said DNA and a detection step to detect said amplified DNA.

23. A method of isolating DNA from whole blood, said method comprising the steps of:
   a) adding water to blood to lyse red blood cells while retaining white blood cells;
   b) passing said white blood cells through the membrane device of claim 1 to trap said white blood cells in or on said filtration membrane;
   c) passing lysing solution through said membrane device to lyse said white blood cells and release DNA;
   d) collecting said lysate solution and said DNA.

\* \* \* \* \*